United States Patent
Sueda et al.

(10) Patent No.: US 6,617,366 B2
(45) Date of Patent: Sep. 9, 2003

(54) CROSSLINKED OLEFIN ELASTOMER FOAM AND ELASTOMER COMPOSITION THEREFOR

(75) Inventors: Takanori Sueda, Ichihara (JP); Naoto Yasaka, Ichihara (JP); Chong-Sun Yoo, Pusan (KR); Jeong-Sik Yoon, Pusan (KR); Kyung-Man Choi, Pusan (KR); Kwon-Ik Lee, Pusan (KR)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/986,947

(22) Filed: Nov. 13, 2001

(65) Prior Publication Data

US 2003/0013778 A1 Jan. 16, 2003

Related U.S. Application Data

(63) Continuation of application No. 09/428,488, filed on Oct. 28, 1999.

(30) Foreign Application Priority Data

| Oct. 30, 1998 | (JP) | 10-310603 |
| Oct. 30, 1998 | (JP) | 10-310604 |
| Mar. 29, 1999 | (JP) | 11-85491 |
| Mar. 31, 1999 | (JP) | 11-92667 |

(51) Int. Cl.[7] ............................................. C08F 210/00
(52) U.S. Cl. .......................... 521/142; 521/134; 521/144
(58) Field of Search ................................. 521/144, 134, 521/142

(56) References Cited

U.S. PATENT DOCUMENTS

| 4,510,303 A | 4/1985 | Oda et al. |
| 6,111,020 A | 8/2000 | Oriani et al. |

FOREIGN PATENT DOCUMENTS

| EP | 520773 A2 | 12/1992 |
| EP | 702032 A2 | 3/1996 |
| WO | WO97/11985 | 4/1997 |

*Primary Examiner*—James J. Seidleck
*Assistant Examiner*—Melanie Bissett
(74) *Attorney, Agent, or Firm*—Burns, Doane, Swecker & Mathis, LLP

(57) ABSTRACT

A crosslinked olefin elastomer foam has a specific gravity of 0.05 to 0.2, an expansion ratio of 8 to 15, a compression set of 30 to 60% and a tear strength of 1.5 to 2.5 kg/cm. The crosslinked foam is obtained by heating an elastomer composition comprising a specific ethylene/$\alpha$-olefin copolymer, an organic peroxide, a crosslinking auxiliary and a foaming agent. The crosslinked foam has a high expansion ratio, is free from surface roughening attributed to defoaming, realizes a soft touch, exhibits a low compression set and is excellent in mechanical strength (particularly tear strength) and heat resistance.

12 Claims, No Drawings

CROSSLINKED OLEFIN ELASTOMER FOAM AND ELASTOMER COMPOSITION THEREFOR

This application is a Continuation Application of applicants' parent application Ser. No. 09/428,488 filed Oct. 28, 1999, to which priority is claimed.

FIELD OF THE INVENTION

The present invention relates to a crosslinked olefin elastomer foam and an elastomer composition therefor. More particularly, the present invention is concerned with a crosslinked olefin elastomer foam which realizes a soft touch, exhibits a low compression set and is excellent in tear strength property and heat resistance, and is concerned with an elastomer composition for the crosslinked foam.

BACKGROUND OF THE INVENTION

A wide variety of foams are commonly produced on a commercial scale and marketed. Foams of vulcanized rubbers and soft olefin plastics can be mentioned as typical examples of such foams.

However, the conventional vulcanized rubbers, although having excellent flexibility and elasticity, inevitably require a time-consuming crosslinking or vulcanization step for realizing these properties, which incurs high cost. On the other hand, it is known to use soft olefin plastics, for example, thermoplastic resins such as ethylene/vinyl acetate copolymer (EVA) and low-density polyethylene in the formation of foams. These soft olefin plastics are basically inferior in heat resistance to the vulcanized rubbers. Thus, they encounter problems such that the applicability of obtained foams is extremely limited and that defoaming is likely to occur because of poor tension at melting to thereby render the expansion ratio low, which defoaming results in apparent surface roughening. Further, in the use of EVA, an increase of vinyl acetate content enhances the tear strength and adherence thereof but deteriorates the abrasion resistance, surface hardness and cell denseness. Therefore, the balance of properties is difficult with the use of EVA. Still further, the specific gravity of EVA itself is high, so that there occurs a problem such that foams of desirably low specific gravity cannot necessarily be obtained.

Therefore, there is a demand for the development of a crosslinked olefin elastomer foam which has a high expansion ratio, is free from surface roughening attributed to defoaming, realizes a soft touch, exhibits a low compression set and is excellent in tear strength property and heat resistance, and the development of an elastomer composition for such a crosslinked foam.

OBJECT OF THE INVENTION

The present invention has been made with a view toward solving the above problems of the prior art. It is an object of the present invention to provide a crosslinked olefin elastomer foam which has a high expansion ratio, is free from surface roughening attributed to defoaming, realizes a soft touch, exhibits a low compression set and is excellent in tear strength property and heat resistance. It is another object of the present invention to provide an elastomer composition for such a crosslinked foam.

SUMMARY OF THE INVENTION

The first crosslinked olefin elastomer foam of the present invention has a specific gravity of 0.05 to 0.2, an expansion ratio of 8 to 15, a compression set of 30 to 60% and a tear strength of 1.5 to 2.5 kg/cm.

Another crosslinked olefin elastomer foam of the present invention has a specific gravity of 0.1 to 0.2, a compression set of 20 to 60% and a tear strength of 2.0 to 4.0 kg/cm. This crosslinked foam is a secondarily compressed crosslinked foam obtained by subjecting the first crosslinked olefin elastomer foam of the present invention to further compression molding.

The first crosslinked olefin elastomer foam of the present invention can be a crosslinked foam obtained by heating an olefin elastomer composition, the olefin elastomer composition comprising:

an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min;

an organic peroxide (D);

a crosslinking auxiliary (E); and a foaming agent (F).

The above ethylene/α-olefin copolymer (A) preferably has a molecular weight distribution (Mw/Mn), as measured by gel permeation chromatography (GPC), of 2.3 to 4.0.

The first crosslinked olefin elastomer foam of the present invention is preferably produced from a composition wherein the ethylene/α-olefin copolymer (A) comprises a mixture of:

5 to 95 parts by weight of an ethylene/α-olefin copolymer (A1) having a density of greater than 0.88 g/cm$^3$ but not greater than 0.90 g/cm$^3$ and a melt flow rate (measured at 190° C. under a load of 2.16 kg in accordance with ASTM D 1238) of 0.1 to 50 g/10 min; and 5 to 95 parts by weight of an ethylene/α-olefin copolymer (A2) having a density of (0.90 to 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A1) and ethylene/α-olefin copolymer (A2) is 100 parts by weight, the mixture having a melt flow rate (measured at 190° C. under a load of 2.16 kg in accordance with ASTM D 1238) of 0.5 to 10 g/10 min.

The first crosslinked olefin elastomer foam of the present invention is also preferably produced from a composition wherein the ethylene/α-olefin copolymer (A) comprises a mixture of:

5 to 95 parts by weight of an ethylene/α-olefin copolymer (A3) having a density of 0.88 to less than 0.91 g/cm$^3$ and a melt flow rate (measured at 190° C. under a load of 2.16 kg in accordance with ASTM D 1238) of 0.1 to 50 g/10 min; and 5 to 95 parts by weight of an ethylene/α-olefin copolymer (A4) having a density of 0.91 to 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A3) and ethylene/α-olefin copolymer (A4) is 100 parts by weight, the mixture having a melt flow rate (measured at 190° C. under a load of 2.16 kg in accordance with ASTM D 1238) of 0.5 to 10 g/10 min.

The α-olefin for forming the ethylene/α-olefin copolymers (A), (A1), (A2), (A3) and (A4) is preferably at least one member selected from the group consisting of propylene, 1-butene, 1-hexene and 1-octene.

The crosslinking auxiliary (E) for use in this invention is preferably triallyl isocyanurate (TAIC) or triallyl cyanurate (TAC).

In this invention, it is preferred that the crosslinking auxiliary (E) and the organic peroxide (D) be used in a weight ratio ((E)/(D)) of 1/8 to 3/1.

An organic or inorganic heat decomposable foaming agent is preferably used as the above foaming agent (F).

The first elastomer composition for crosslinked olefin elastomer foam according to the present invention comprises:

an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min;

an organic peroxide (D);

a crosslinking auxiliary (E); and a foaming agent (F).

It is preferred that the ethylene/α-olefin copolymer (A) have a molecular weight distribution (Mw/Mn), as measured by gel permeation chromatography (GPC), of 2.3 to 4.0.

The first elastomer composition for crosslinked olefin elastomer foam according to the present invention is preferably a composition comprising:

an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min;

an organic peroxide (D);

a crosslinking auxiliary (E); and a foaming agent (F), wherein the ethylene/α-olefin copolymer (A) comprises a mixture of:

5 to 95 parts by weight of an ethylene/α-olefin copolymer (A1) having a density of greater than 0.88 g/cm$^3$ but not greater than 0.90 g/cm$^3$ and a melt flow rate (measured at 190° C. under a load of 2.16 kg in accordance with ASTM D 1238) of 0.1 to 50 g/10 min; and 5 to 95 parts by weight of an ethylene/α-olefin copolymer (A2) having a density of 0.90 to 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A1) and ethylene/α-olefin copolymer (A2) is 100 parts by weight, the mixture having a melt flow rate (measured at 190° C. under a load of 2.16 kg in accordance with ASTM D 1238) of 0.5 to 10 g/10 min.

The first elastomer composition for crosslinked olefin elastomer foam according to the present invention is also preferably a composition comprising:

an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min;

an organic peroxide (D);

a crosslinking auxiliary (E); and a foaming agent (F), wherein the ethylene/α-olefin copolymer (A) comprises a mixture of:

5 to 95 parts by weight of an ethylene/α-olefin copolymer (A3) having a density of 0.88 to less than 0.91 g/cm$^3$ and a melt flow rate (measured at 190° C. under a load of 2.16 kg in accordance with ASTM D 1238) of 0.1 to 50 g/10 min; and 5 to 95 parts by weight of an ethylene/α-olefin copolymer (A4) having a density of 0.91 to 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A3) and ethylene/α-olefin copolymer (A4) is 100 parts by weight, the mixture having a melt flow rate (measured at 190° C. under a load of 2.16 kg in accordance with ASTM D 1238) of 0.5 to 10 g/10 min.

The first elastomer composition for crosslinked olefin elastomer foam according to the present invention enables preparation of the crosslinked foam having a specific gravity of 0.05 to 0.2, an expansion ratio of 8 to 15, a compression set of 30 to 60% and a tear strength of 1.5 to 2.5 kg/cm.

The second crosslinked olefin elastomer foam of the present invention is a crosslinked foam obtained by heating an olefin elastomer composition, the olefin elastomer composition comprising:

70 to 95 parts by weight of an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min, and 5 to 30 parts by weight of a modified polyolefin (B) obtained by grafting a polyolefin with an unsaturated carboxylic acid or a derivative thereof, provided that the sum of ethylene/α-olefin copolymer (A) and modified polyolefin (B) is 100 parts by weight;

an organic peroxide (D);

a crosslinking auxiliary (E); and a foaming agent (F).

It is preferred that the ethylene/α-olefin copolymer (A) have a molecular weight distribution (Mw/Mn), as measured by gel permeation chromatography (GPC), of 2.3 to 4.0.

The second crosslinked olefin elastomer foam of the present invention is preferably obtained from the composition wherein the ethylene/α-olefin copolymer (A) comprises a mixture of:

5 to 95 parts by weight of an ethylene/α-olefin copolymer (A1) having a density of greater than 0.88 g/cm$^3$ but not greater than 0.90 g/cm$^3$ and a melt flow rate (measured at 190° C. under a load of 2.16 kg in accordance with ASTM D 1238) of 0.1 to 50 g/10 min, and 5 to 95 parts by weight of an ethylene/α-olefin copolymer (A2) having a density of 0.90 to 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A1) and ethylene/α-olefin copolymer (A2) is 100 parts by weight, the mixture having a melt flow rate (measured at 190° C. under a load of 2.16 kg in accordance with ASTM D 1238) of 0.5 to 10 g/10 min.

The third crosslinked olefin elastomer foam of the present invention is a crosslinked foam obtained by heating an olefin elastomer composition, the olefin elastomer composition comprising:

50 to 95 parts by weight of an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min, and 5 to 50 parts by weight of a high-pressure processed low-density polyethylene (C) having a density of 0.91 to less than 0.93 g/cm³ and a melt flow rate (measured at 190° C. under a load of 2.16 kg in accordance with ASTM D 1238) of 0.1 to 50 g/10 min, provided that the sum of ethylene/α-olefin copolymer (A) and high-pressure processed low-density polyethylene (C) is 100 parts by weight;

an organic peroxide (D);

a crosslinking auxiliary (E); and a foaming agent (F).

The fourth crosslinked olefin elastomer foam of the present invention is a crosslinked foam obtained by heating an olefin elastomer composition, the olefin elastomer composition comprising:

5 to 90 parts by weight of an ethylene/α-olefin copolymer (A1) having a density of greater than 0.88 g/cm³ but not greater than 0.90 g/cm³ and a melt flow rate (measured at 190° C. under a load of 2.16 kg in accordance with ASTM D 1238) of 0.1 to 50 g/10 min, 5 to 90 parts by weight of an ethylene/α-olefin copolymer (A2) having a density of 0.90 to 0.93 g/cm³ and a melt flow rate (measured at 190° C. under a load of 2.16 kg in accordance with ASTM D 1238) of 0.1 to 50 g/10 min, and 5 to 50 parts by weight of a high-pressure processed low-density polyethylene (C) having a density of 0.91 to less than 0.93 g/cm³ and a melt flow rate (measured at 190° C. under a load of 2.16 kg in accordance with ASTM D 1238) of 0.1 to 50 g/10 min, provided that the sum of ethylene/α-olefin copolymer (A1), ethylene/α-olefin copolymer (A2) and high-pressure processed low-density polyethylene (C) is 100 parts by weight;

an organic peroxide (D);

a crosslinking auxiliary (E); and a foaming agent (F), wherein the ethylene/α-olefin copolymer (A1) and the ethylene/α-olefin copolymer (A2) constitute a mixture having a melt flow rate (measured at 190° C. under a load of 2.16 kg in accordance with ASTM D 1238) of 0.5 to 10 g/10 min.

The fifth crosslinked olefin elastomer foam of the present invention is a crosslinked foam obtained by heating an olefin elastomer composition, the olefin elastomer composition comprising:

20 to 90 parts by weight of an ethylene/α-olefin copolymer (A) having a density of 0.88 to 0.92 g/cm³ and a melt flow rate (measured at 190° C. under a load of 2.16 kg in accordance with ASTM D 1238) of 0.1 to 10 g/10 min, 5 to 30 parts by weight of a modified polyolefin (B) obtained by grafting a polyolefin with an unsaturated carboxylic acid or a derivative thereof, and 5 to 50 parts by weight of a high-pressure processed low-density polyethylene (C) having a density of 0.91 to less than 0.93 g/cm³ and a melt flow rate (measured at 190° C. under a load of 2.16 kg in accordance with ASTM D 1238) of 0.1 to 50 g/10 min, provided that the sum of ethylene/α-olefin copolymer (A), modified polyolefin (B) and high-pressure processed low-density polyethylene (C) is 100 parts by weight;

an organic peroxide (D);

a crosslinking auxiliary (E); and a foaming agent (F).

The sixth crosslinked olefin elastomer foam of the present invention is a crosslinked foam obtained by heating an olefin elastomer composition, the olefin elastomer composition comprising:

5 to 85 parts by weight of an ethylene/α-olefin copolymer (A1) having a density of greater than 0.88 g/cm³ but not greater than 0.90 g/cm³ and a melt flow rate (measured at 190° C. under a load of 2.16 kg in accordance with ASTM D 1238) of 0.1 to 50 g/10 min, 5 to 85 parts by weight of an ethylene/α-olefin copolymer (A2) having a density of 0.90 to 0.93 g/cm³ and a melt flow rate (measured at 190° C. under a load of 2.16 kg in accordance with ASTM D 1238) of 0.1 to 50 g/10 min, 5 to 30 parts by weight of a modified polyolefin (B) obtained by grafting a polyolefin with an unsaturated carboxylic acid or a derivative thereof, and 5 to 50 parts by weight of a high-pressure processed low-density polyethylene (C) having a density of 0.91 to less than 0.93 g/cm³ and a melt flow rate (measured at 190° C. under a load of 2.16 kg in accordance with ASTM D 1238) of 0.1 to 50 g/10 min, provided that the sum of ethylene/α-olefin copolymer (A1), ethylene/α-olefin copolymer (A2), modified polyolefin (B) and high-pressure processed low-density polyethylene (C) is 100 parts by weight;

an organic peroxide (D);

a crosslinking auxiliary (E); and a foaming agent (F), wherein the ethylene/α-olefin copolymer (A1) and the ethylene/α-olefin copolymer (A2) constitute a mixture having a melt flow rate (measured at 190° C. under a load of 2.16 kg in accordance with ASTM D 1238) of 0.5 to 10 g/10 min.

The α-olefin for forming the ethylene/α-olefin copolymers (A), (A1) and (A2) is preferably at least one member selected from the group consisting of propylene, 1-butene, 1-hexene and 1-octene.

The crosslinking auxiliary (E) for use in this invention is preferably triallyl isocyanurate (TAIC) or triallyl cyanurate (TAC).

In this invention, the crosslinking auxiliary (E) and the organic peroxide (D) are preferably used in a weight ratio ((E)/(D)) of 1/8 to 3/1.

The second elastomer composition for crosslinked olefin elastomer foam according to the present invention comprises:

70 to 95 parts by weight of an ethylene/α-olefin copolymer (A) having a density of 0.88 to 0.92 g/cm³ and a melt flow rate (measured at 190° C. under a load of 2.16 kg in accordance with ASTM D 1238) of 0.1 to 10 g/10 min, and 5 to 30 parts by weight of a modified polyolefin (B) obtained by grafting a polyolefin with an unsaturated carboxylic acid or a derivative thereof, provided that the sum of ethylene/α-olefin copolymer (A) and modified polyolefin (B) is 100 parts by weight;

an organic peroxide (D);

a crosslinking auxiliary (E); and a foaming agent (F).

The second elastomer composition for crosslinked olefin elastomer foam according to the present invention enables producing the crosslinked foam having a low specific gravity and being excellent in compression set, mechanical strength (particularly tear strength) and adhesive strength.

It is preferred that the ethylene/α-olefin copolymer (A) have a molecular weight distribution (Mw/Mn), as measured by gel permeation chromatography (GPC), of 2.3 to 4.0.

The above ethylene/α-olefin copolymer (A) preferably comprises a mixture of:

5 to 95 parts by weight of an ethylene/α-olefin copolymer (A1) having a density of greater than 0.88 g/cm$^3$ but not greater than 0.90 g/cm$^3$ and a melt flow rate (measured at 190° C. under a load of 2.16 kg in accordance with ASTM D 1238) of 0.1 to 50 g/10 min, and 5 to 95 parts by weight of an ethylene/α-olefin copolymer (A2) having a density of 0.90 to 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A1) and ethylene/α-olefin copolymer (A2) is 100 parts by weight, the mixture having a melt flow rate (measured at 190° C. under a load of 2.16 kg in accordance with ASTM D 1238) of 0.5 to 10 g/10 min.

The use of the mixture of the ethylene/α-olefin copolymers (A1) and (A2) as the ethylene/α-olefin copolymer (A) in the second elastomer composition enables producing a crosslinked foam having a low specific gravity and being excellent in compression set, mechanical strength (particularly tear strength) and adhesive strength and high in hardness.

The third elastomer composition for crosslinked olefin elastomer foam according to the present invention comprises:

50 to 95 parts by weight of an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min, and 5 to 50 parts by weight of a high-pressure processed low-density polyethylene (C) having a density of 0.91 to less than 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A) and high-pressure processed low-density polyethylene (C) is 100 parts by weight;

an organic peroxide (D);

a crosslinking auxiliary (E); and a foaming agent (F).

The third elastomer composition for crosslinked olefin elastomer foam according to the present invention enables producing the crosslinked foam having a low specific gravity and being excellent in compression set and mechanical strength (particularly tear strength) and high in hardness.

The fourth elastomer composition for crosslinked olefin elastomer foam according to the present invention comprises:

5 to 90 parts by weight of an ethylene/α-olefin copolymer (A1) having a density of greater than 0.88 g/cm$^3$ but not greater than 0.90 g/cm$^3$ and a melt flow rate (measured at 190° C. under a load of 2.16 kg in accordance with ASTM D 1238) of 0.1 to 50 g/10 min, 5 to 90 parts by weight of an ethylene/α-olefin copolymer (A2) having a density of 0.90 to 0.93 g/cm$^3$ and a melt flow rate (measured at 190° C. under a load of 2.16 kg in accordance with ASTM D 1238) of 0.1 to 50 g/10 min, and 5 to 50 parts by weight of a high-pressure processed low-density polyethylene (C) having a density of 0.91 to less than 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A1), ethylene/α-olefin copolymer (A2) and high-pressure processed low-density polyethylene (C) is 100 parts by weight;

an organic peroxide (D);

a crosslinking auxiliary (E); and a foaming agent (F), wherein the ethylene/α-olefin copolymer (A1) and the ethylene/α-olefin copolymer (A2) constitute a mixture having a melt flow rate (measured at 190° C. under a load of 2.16 kg in accordance with ASTM D 1238) of 0.5 to 10 g/10 min.

The fourth elastomer composition for crosslinked olefin elastomer foam according to the present invention enables producing the crosslinked foam having a low specific gravity and being excellent in compression set and mechanical strength (particularly tear strength) and high in hardness.

The fifth elastomer composition for crosslinked olefin elastomer foam according to the present invention comprises:

20 to 90 parts by weight of an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 min, 5 to 30 parts by weight of a modified polyolefin (B) obtained by grafting a polyolefin with an unsaturated carboxylic acid or a derivative thereof, and 5 to 50 parts by weight of a high-pressure processed low-density polyethylene (C) having a density of 0.91 to less than 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A), modified polyolefin (B) and high-pressure processed low-density polyethylene (C) is 100 parts by weight;

an organic peroxide (D);

a crosslinking auxiliary (E); and a foaming agent (F).

The fifth elastomer composition for crosslinked olefin elastomer foam according to the present invention enables producing the crosslinked foam having a low specific gravity and being excellent in compression set, mechanical strength (particularly tear strength) and adhesive strength and high in hardness.

The sixth elastomer composition for crosslinked olefin elastomer foam according to the present invention comprises:

5 to 85 parts by weight of an ethylene/α-olefin copolymer (A1) having a density of greater than 0.88 g/cm$^3$ but not greater than 0.90 g/cm$^3$ and a melt flow rate (measured at 190° C. under a load of 2.16 kg in accordance with ASTM D 1238) of 0.1 to 50 g/10 min, 5 to 85 parts by weight of an ethylene/α-olefin copolymer (A2) having a density of 0.90 to 0.93 g/cm$^3$ and a melt flow rate (measured at 190° C. under a load of 2.16 kg in accordance with ASTM D 1238) of 0.1 to 50 g/10 min, 5 to 30 parts by weight of a modified polyolefin (B) obtained by grafting a polyolefin with an unsaturated carboxylic acid or a derivative thereof, and 5 to 50 parts by weight of a high-pressure processed low-density polyethylene (C) having a density of 0.91 to less than 0.93 g/cm$^3$ and a melt flow rate (measured at 190° C. under a load of 2.16 kg in accordance with ASTM D 1238) of 0.1 to 50 g/10 min, provided that the sum of ethylene/α-olefin copolymer (A1), ethylene/α- olefin copolymer (A2), modified polyolefin (B) and high-pressure processed low-density polyethylene (C) is 100 parts by weight;

an organic peroxide (D);

a crosslinking auxiliary (E); and a foaming agent (F), wherein the ethylene/α-olefin copolymer (A1) and the ethylene/α-olefin copolymer (A2) constitute a mixture having a melt flow rate (measured at 190° C. under a load of 2.16 kg in accordance with ASTM D 1238) of 0.5 to 10 g/10 min.

The sixth elastomer composition for corsslinked olefin elastomer foam according to the present invention enables producing the crosslinked foam having a low specific gravity and being excellent in compression set, mechanical strength (particularly tear strength) and adhesive strength and high in hardness.

In this invention, the crosslinking auxiliary (E) and the organic peroxide (D) are preferably used in a weight ratio ((E)/(D)) of 1/8 to 3/1.

The second, third, fourth, fifth and sixth elastomer compositions for crosslinked olefin elastomer foam according to the present invention enable preparation of the crosslinked foam having a specific gravity of 0.05 to 0.2, an expansion ratio of 8 to 15, a compression set of 30 to 60% and a tear strength of 1.5 to 2.5 kg/cm.

Further compression molding of the second, third, fourth, fifth and sixth crosslinked olefin elastomer foams according to the present invention enables preparation of the secondarily compressed crosslinked foam having a specific gravity of 0.1 to 0.2, a compression set of 20 to 60% and a tear strength of 2.0 to 4.0 kg/cm.

The seventh crosslinked olefin elastomer foam of the present invention is a crosslinked foam obtained by heating an olefin elastomer composition, the olefin elastomer composition comprising:

70 to 98 parts by weight of an ethylene/α-olefin copolymer (G) having a density of 0.88 to 0.92 g/cm$^3$ and a melt flow rate (measured at 190° C. under a load of 2.16 kg in accordance with ASTM D 1238) of 0.1 to 50 g/10 min, and 2 to 30 parts by weight of a polypropylene (H) having a melt flow rate (measured at 230° C. under a load of 2.16 kg in accordance with ASTM D 1238) of 0.5 to 50 g/10 min, provided that the sum of ethylene/α-olefin copolymer (G) and polypropylene (H) is 100 parts by weight;

an organic peroxide (D);

a crosslinking auxiliary (E); and a foaming agent (F), wherein the ethylene/α-olefin copolymer (G) and the polypropylene (H) constitute a mixture having a melt flow rate (measured at 230° C. under a load of 2.16 kg in accordance with ASTM D 1238) of 0.1 to 10 g/10 min.

The polypropylene (H) can be at least one member selected from the group consisting of propylene homopolymer, propylene block copolymers and propylene/α-olefin random copolymers.

The α-olefin for forming the propylene/α-olefin random copolymer is preferably at least one member selected from the group consisting of ethylene, 1-butene, 1-hexene and 1-octene.

The crosslinking auxiliary (E) for use in this invention is preferably triallyl isocyanurate (TAIC) or triallyl cyanurate (TAC).

In this invention, the crosslinking auxiliary (E) and the organic peroxide (D) are preferably used in a weight ratio ((E)/(D)) of 1/8 to 3/1.

An organic or inorganic heat decomposable foaming-agent is preferably used as the above foaming agent (F).

The seventh elastomer composition for crosslinked olefin elastomer foam according to the present invention comprises:

70 to 98 parts by weight of an ethylene/α-olefin copolymer (G) having a density of 0.88 to 0.92 g/cm$^3$ and a melt flow rate (measured at 190° C. under a load of 2.16 kg in accordance with ASTM D 1238) of 0.1 to 50 g/10 min, and 2 to 30 parts by weight of a polypropylene (H) having a melt flow rate (measured at 230° C. under a load of 2.16 kg in accordance with ASTM D 1238) of 0.5 to 50 g/10 min, provided that the sum of ethylene/α-olefin copolymer (G) and polypropylene (H) is 100 parts by weight;

an organic peroxide (D);

a crosslinking auxiliary (E); and a foaming agent (F), wherein the ethylene/α-olefin copolymer (G) and the polypropylene (H) constitute a mixture having a melt flow rate (measured at 230° C. under a load of 2.16 kg in accordance with ASTM D 1238) of 0.1 to 10 g/10 min.

The seventh elastomer composition for crosslinked olefin elastomer foam according to the present invention enables preparation of the crosslinked foam having a specific gravity of 0.05 to 0.2, an expansion ratio of 8 to 15, a compression set of 30 to 60% and a tear strength of 1.5 to 2.5 kg/cm.

Further compression molding of this crosslinked foam enables preparation of the secondarily compressed crosslinked foam having a specific gravity of 0.1 to 0.2, a compression set of 20 to 60% and a tear strength of 2.0 to 4.0 kg/cm.

DETAILED DESCRIPTION OF THE INVENTION

The crosslinked olefin elastomer foams and elastomer compositions therefor according to the present invention will be described in detail below.

Now, the first crosslinked olefin elastomer foam and elastomer composition therefor according to the present invention will be described in detail.

First Crosslinked Foam

The first crosslinked olefin elastomer foam of the present invention has a specific gravity (JIS K 7112) of 0.05 to 0.2, an expansion ratio of 8 to 15, a compression set (JIS K 6301) of 30 to 60% and a tear strength (BS5131-2.6) of 1.5 to 2.5 kg/cm. The first crosslinked olefin elastomer foam of the present invention which possesses these characteristics has an appropriate crosslink structure, realizes a soft touch, has a high expansion ratio and a low specific gravity, is free from surface roughening attributed to defoaming, exhibits a low compression set and is excellent in tear strength property and heat resistance.

The other crosslinked olefin elastomer foam of the present invention has a specific gravity of 0.1 to 0.2, a compression set of 20 to 60% and a tear strength of 2.0 to 4.0 kg/cm. This crosslinked foam is a secondarily compressed crosslinked foam obtained by subjecting the first crosslinked olefin elastomer foam of the present invention to further compression molding.

It is preferred that the crosslinked foam and secondarily compressed crosslinked foam be prepared from the first elastomer composition for crosslinked olefin elastomer foam according to the present invention.

The first elastomer composition for crosslinked olefin elastomer foam according to the present invention is a composition not crosslinked and not foamed which is crosslinked and foamed upon being heated at given temperature or over. It comprises a specified ethylene/α-olefin copolymer (A), an organic peroxide (D), a crosslinking auxiliary (E) and a foaming agent (F).

Ethylene/α-olefin Copolymer (A)

The ethylene/α-olefin copolymer (A) for use in the present invention is an amorphous or lowly crystalline random copolymer prepared from ethylene and an α-olefin having 3 to 20 carbon atoms. It is preferably a soft ethylene/α-olefin copolymer having a density (ASTM D 1505) of 0.88 to 0.92 g/cm$^3$ and a melt flow rate (MFR measured at 190° C. under a load of 2.16 kg in accordance with ASTM D 1238) of 0.1 to 10 g/10 min, especially 0.5 to 10 g/10 min.

It is preferred that the ethylene/α-olefin copolymer (A) have a molecular weight distribution (Mw/Mn), as measured by gel permeation chromatography (GPC), of 2.3 to 4.0. The use of the ethylene/α-olefin copolymer (A) whose molecular weight distribution (Mw/Mn) falls within the above range enables preparation of an elastomer composition from which a crosslinked elastomer foam having a low specific gravity (high expansion) and excellent compression set can be produced.

The above molecular weight distribution (Mw/Mn) is measured by the use of GPC-150C manufactured by Millipore under the following conditions.

Measurement is performed under the conditions such that TSK GNH HT is used as a separation column, the column size is 72 mm diameter and 600 mm length, the column temperature is 140° C., o-dichlorobenzene (produced by Wako Pure Chemical Industries, Ltd.) and 0.025 wt. % BHT (produced by Takeda Chemical Industries, Ltd.) are used as a mobile phase and an antioxidant, respectively, the moving velocity is 1.0 ml/min, the sample concentration and the quantity of sample injected are 0.1 wt. % and 500 microliters, respectively, and a differential refractometer is used as the detector. Standard polystyrene for molecular weight Mw<1000 and Mw>4×10$^6$ is one produced by Tosoh Corporation while standard polystyrene for 1000≦Mw≦4×10$^6$ is one produced by Pressure Chemical.

The α-olefin copolymerized with ethylene can be selected from among α-olefins having 3 to 20 carbon atoms, examples of which include propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene and 4-methyl-1-pentene. Of these, α-olefins having 3 to 10 carbon atoms are preferred. Propylene, 1-butene, 1-hexene and 1-octene are especially preferred. These α-olefins can be used either individually or in combination.

It is preferred that the above ethylene/α-olefin copolymer (A) contain units derived from ethylene in an amount of 85 to 98 mol % and units derived from α-olefins having 3 to 20 carbon atoms in an amount of 2 to 15 mol %.

The composition of the ethylene/α-olefin copolymer (A) is generally determined by homogeneously dissolving about 200 mg of the copolymer in 1 ml of hexachlorobutadiene in a sample tube of 10 mm diameter to thereby obtain a sample solution and subjecting the sample solution to $^{13}$C-NMR spectroscopy under the conditions such that the measuring temperature is 120° C., the measuring frequency 25.05 MHz, the spectrum width 1500 Hz, the pulse cycle time 4.2 sec and the pulse width 6 μsec.

Furthermore, the ethylene/α-olefin copolymer (A) may contain units derived from other polymerizable monomers than the above monomers to an extent such that the object of the present invention is not departed from.

Examples of suitable ethylene/α-olefin copolymers (A) include ethylene/propylene random copolymer, ethylene/1-butene random copolymer, ethylene/propylene/1-butene random copolymer, ethylene/propylene/ethylidenenorbornene random copolymer, ethylene/1-hexene random copolymer and ethylene/1-octene random copolymer. Of these, ethylene/propylene random copolymer, ethylene/1-butene random copolymer, ethylene/1-hexene random copolymer and ethylene/1-octene random copolymer are preferred. These copolymers may be used in combination.

The use of linear ethylene/α-olefin copolymer exhibiting an intrinsic viscosity ratio (gη*) of greater than 0.95 is advantageous in that the final foam molding exhibits a low shrinkage ratio. The intrinsic viscosity ratio (gη*) is calculated by the formula:

$$g\eta^* = (\eta)/(\eta)_{blank}$$

wherein:

(η): intrinsic viscosity of the copolymer as measured in decalin at 135° C., and (η)$_{blank}$: intrinsic viscosity of linear ethylene/α-olefin copolymer of 70 mol % ethylene content having the same weight average molecular weight (measured by light scattering).

In this connection, reference is made to Japanese Patent Publication No. 3(1991)-14045.

On the other hand, the use of long-chain branched ethylene/α-olefin copolymer exhibiting a gη* value of 0.2 to 0.95 realizes a desirable fluidity and a high melt tension to thereby ensure excellent moldability and also realizes a high expansion ratio and an excellent compression set.

As preferable ethylene/α-olefin copolymer (A), there can be mentioned:

a mixture of the following ethylene/α-olefin copolymers (A1) and (A2), the mixture exhibiting a melt flow rate (measured at 190° C. under a load of 2.16 kg in accordance with ASTM D 1238) of 0.5 to 10 g/10 min, or a mixture of the following ethylene/α-olefin copolymers (A3) and (A4), the mixture exhibiting a melt flow rate (measured at 190° C. under a load of 2.16 kg in accordance with ASTM D 1238) of 0.5 to 10 g/10 min.

It is preferred that each of the mixture of ethylene/α-olefin copolymers (A1) and (A2) and the mixture of ethylene/α-olefin copolymers (A3) and (A4) have a molecular weight distribution (Mw/Mn), as measured by gel permeation chromatography (GPC), of 2.3 to 4.0. The use of the mixture of ethylene/α-olefin copolymers (A1) and (A2) whose molecular weight distribution (Mw/Mn) falls within the above range or the mixture of ethylene/α-olefin copolymers (A3) and (A4) whose molecular weight distribution (Mw/Mn) falls within the above range enables preparation of an elastomer composition from which a crosslinked elastomer foam having a low specific gravity (high expansion) and being excellent in compression set can be produced.

The ethylene/α-olefin copolymer (A1) is an amorphous or lowly crystalline random copolymer prepared from ethylene and an α-olefin having 3 to 20 carbon atoms. It is preferably a soft ethylene/α-olefin copolymer having a density (ASTM D 1505) of greater than 0.88 g/cm$^3$ but not greater than 0.90 g/cm$^3$ and a melt flow rate (MFR measured at 190° C. under a load of 2.16 kg in accordance with ASTM D 1238) of 0.1 to 50 g/10 min, especially 0.5 to 20 g/10 min.

It is preferred that the ethylene/α-olefin copolymer (A1) contain units derived from ethylene in an amount of 85 to 93 mol % and units derived from α-olefins having 3 to 20 carbon atoms in an amount of 7 to 15 mol %.

The ethylene/α-olefin copolymer (A1) generally has a crystallinity, as measured by X-ray diffractometry, of 40% or below, preferably 10 to 30%.

This ethylene/α-olefin copolymer (A1) can be produced by the conventional process in which use is made of a vanadium catalyst, a titanium catalyst, a metallocene catalyst or the like.

The ethylene/α-olefin copolymer (A2) is an amorphous or lowly crystalline random copolymer prepared from ethylene and an α-olefin having 3 to 20 carbon atoms. It is preferably a soft ethylene/α-olefin copolymer having a density (ASTM D 1505) of 0.90 to 0.93 g/cm$^3$, especially 0.91 to 0.92 g/cm$^3$, and a melt flow rate (MFR measured at 190° C. under a load of 2.16 kg in accordance with ASTM D 1238) of 0.1 to 50 g/10 min, especially 0.5 to 20 g/10 min.

It is preferred that the ethylene/α-olefin copolymer (A2) contain units derived from ethylene in an amount of 93 to 98 mol % and units derived from α-olefins having 3 to 20 carbon atoms in an amount of 2 to 7 mol %.

This ethylene/α-olefin copolymer (A2) can be produced by the conventional process in which use is made of a Ziegler catalyst, a metallocene catalyst or the like.

The ethylene/α-olefin copolymer (A1) is used in an amount of 5 to 95 parts by weight, preferably 50 to 90 parts by weight, while the ethylene/α-olefin copolymer (A2) is used in an amount of 5 to 95 parts by weight, preferably 10 to 50 parts by weight, provided that the sum of ethylene/α-olefin copolymer (A1) and ethylene/α-olefin copolymer (A2) is 100 parts by weight.

The use of a long-chain branched ethylene/α-olefin copolymer whose gη* value is in the range of 0.2 to 0.95 as either of the ethylene/α-olefin copolymers (A1) and (A2) leads to an increased expansion ratio and enables preparation of an elastomer composition from which a crosslinked elastomer foam excellent in compression set can be produced.

The gη* value can be determined by the method described in Japanese Patent Publication No. 3(1991)-14045. Ethylene/α-olefin copolymers whose gη* value is greater than 0.95 but not greater than 1.0 are linear. In particular, when the gη* value is in the range of 0.2 to 0.95, the ethylene/α-olefin copolymer is a relatively-long-chain branched copolymer.

The ethylene/α-olefin copolymer (A3) is an amorphous or lowly crystalline random copolymer prepared from ethylene and an α-olefin having 3 to 20 carbon atoms. It is preferably a soft ethylene/α-olefin copolymer having a density (ASTM D 1505) of 0.88 to less than 0.91 g/cm$^3$ and a melt flow rate (MFR measured at 190° C. under a load of 2.16 kg in accordance with ASTM D 1238) of 0.1 to 50 g/10 min, especially 0.5 to 20 g/10 min.

It is preferred that the ethylene/α-olefin copolymer (A3) contain units derived from ethylene in an amount of 85 to 93 mol % and units derived from α-olefins having 3 to 20 carbon atoms in an amount of 7 to 15 mol %.

The ethylene/α-olefin copolymer (A3) generally has a crystallinity, as measured by X-ray diffractometry, of 40% or below, preferably 10 to 30%.

This ethylene/α-olefin copolymer (A3) can be produced by the conventional process in which use is made of a vanadium catalyst, a titanium catalyst, a metallocene catalyst or the like.

The ethylene/α-olefin copolymer (A4) is an amorphous or lowly crystalline random copolymer prepared from ethylene and an α-olefin having 3 to 20 carbon atoms. It is preferably a soft ethylene/α-olefin copolymer having a density (ASTM D 1505) of 0.91 to 0.93 g/cm$^3$, especially 0.91 to 0.92 g/cm$^3$, and a melt flow rate (MFR measured at 190° C. under a load of 2.16 kg in accordance with ASTM D 1238) of 0.1 to 50 g/10 min, especially 0.5 to 20 g/10 min.

It is preferred that the ethylene/α-olefin copolymer (A4) contain units derived from ethylene in an amount of 93 to 98 mol % and units derived from α-olefins having 3 to 20 carbon atoms in an amount of 2 to 7 mol %.

This ethylene/α-olefin copolymer (A4) can be produced by the conventional process in which use is made of a Ziegler catalyst, a metallocene catalyst or the like.

The ethylene/α-olefin copolymer (A3) is used in an amount of 5 to 95 parts by weight, preferably 50 to 90 parts by weight, while the ethylene/α-olefin copolymer (A4) is used in an amount of 5 to 95 parts by weight, preferably 10 to 50 parts by weight, provided that the sum of ethylene/α-olefin copolymer (A3) and ethylene/α-olefin copolymer (A4) is 100 parts by weight.

The use of a long-chain branched ethylene/α-olefin copolymer whose gη* value is in the range of 0.2 to 0.95 as either of the ethylene/α-olefin copolymers (A3) and (A4) leads to an increased expansion ratio and enables preparation of an elastomer composition from which a crosslinked elastomer foam excellent in compression set can be produced.

Organic Peroxide (D)

The organic peroxide (D) for use as a crosslinking agent in the present invention can be selected from among, for example, dicumyl peroxide, di-t-butyl peroxide, 2,5-dimethyl-2,5-di(t-butylperoxy)hexane, 2,5-dimethyl-2,5-di (t-butylperoxy)hexyne-3, 1,3-bis(t-butylperoxyisopropyl) benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butyl peroxybenzoate, t-butyl perbenzoate, t-butyl peroxyisopropyl carbonate, diacetyl peroxide, lauroyl peroxide and t-butyl cumyl peroxide.

In the present invention, the organic peroxide (D) is generally used in an amount of 0.1 to 1.5 parts by weight, preferably 0.2 to 1.0 part by weight, per 100 parts by weight of ethylene/α-olefin copolymer (A). The use of the organic peroxide (D), together with a crosslinking auxiliary (E), in the above amount enables obtaining a crosslinked foam with an appropriate crosslink structure.

Crosslinking Auxiliary (E)

The crosslinking auxiliary (E) for use in the present invention can be selected from among, for example, peroxy crosslinking auxiliaries such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylenedimaleimide; divinylbenzene, triallyl cyanurate (TAC) and triallyl isocyanurate (TAIC); polyfunctional methacrylate monomers such as ethylene glycol dimethacrylate, diethylene glycol dimethacrylate, polyethylene glycol dimethacrylate, trimethylolpropane trimethacrylate and allyl methacrylate; and polyfunctional vinyl monomers such as vinyl butyrate and vinyl stearate. Of these, triallyl cyanurate (TAC) and triallyl isocyanurate (TAIC) are preferred.

In the present invention, the above crosslinking auxiliary (E) is preferably used at a weight ratio of crosslinking auxiliary (E) to organic peroxide (D) ((E)/(D)) of 1/10 to 5/1, still preferably 1/8 to 3/1, and optimally 1/5 to 2/1.

Foaming Agent (F)

The foaming agent (F) for use in the present invention can be selected from among, for example, organic heat decomposable foaming agents such as azodicarbonamide (ADCA), N,N'-dinitrosopentamethylenetetramine, 4,4'-oxybis (benzenesulfonylhydrazide), diphenylsulfone-3,3'-disulfonylhydrazide, p-toluenesulfonylsemicarbazide and trihydrazinotriazine; and inorganic heat decomposable foaming agents such as sodium hydrogencarbonate, sodium carbonate, ammonium hydrogencarbonate and ammonium carbonate. Of these, azodicarbonamide (ADCA) and sodium hydrogencarbonate are especially preferred.

In the present invention, the foaming agent (F) is generally used in an amount of 3 to 20 parts by weight, preferably 5 to 15 parts by weight, per 100 parts by weight of ethylene/α-olefin copolymer (A). The use of the foaming agent (F) in the above amount enables obtaining a foam molding whose expansion ratio and closed cell ratio are high. The amount of foaming agent (F) used is decided taking into account the expansion ratio of crosslinked foam.

Production of First Elastomer Composition

The first elastomer composition for crosslinked olefin elastomer foam according to the present invention is a noncrosslinked nonfoamed composition, which may be in molten form or in the form of pellets or a sheet obtained by cooling the melt to effect solidification.

Pellets of the first elastomer composition of the present invention can be produced by, for example, mixing together the above ethylene/α-olefin copolymer (A), organic peroxide (D), crosslinking auxiliary (E) and foaming agent (F) in the above amounts by means of Henschel mixer or the like, and melting and plasticizing the mixture by means of a blender such as a banbury mixer, an extruder or the like at such a temperature that the foaming agent (F) and organic peroxide (D) are not decomposed to thereby effect homogeneous mixing and dispersion, followed by pelletization by means of a pelletizer.

This composition can optionally be loaded with various additives such as a filler, a heat stabilizer, a weathering stabilizer, a flame retarder, a hydrochloric acid absorber and a pigment in addition to the above components to an extent such that the object of the present invention is not departed from.

On the other hand, a sheet of the first elastomer composition of the present invention can be produced by, for example, sheeting the above obtained pellets of the composition by the use of an extruder or a calendering machine. Alternatively, the foamable sheet in the noncrosslinked and nonfoamed state can be produced by blending together composition components by means of, for example, Brabender Plastograph and, thereafter, sheeting the blend by means of calender rolls or a press molding machine. Furthermore, the foamable sheet can be produced by blending composition components by means of an extruder and, thereafter, sheeting the blend through T dies or annular dies.

Production of First Crosslinked Olefin Elastomer Foam

The first crosslinked olefin elastomer foam of the present invention can be produced by, for example, the following procedure.

Crosslinked foam can be obtained by feeding a given amount of the thus obtained noncrosslinked nonfoamed composition sheet into a pressure molding metal mold heated at 160 to 175° C., melting the sheet under pressure to thereby effect a crosslinking reaction and decomposition of the foaming agent (F), and opening the pressure molding metal mold to thereby foam the composition.

With respect to the pressured crosslinking foaming molding conditions in the pressure molding metal mold, the metal mold temperature must not be lower than the decomposition temperature of the foaming agent (F). It is preferred that the metal mold temperature be not lower than the melting temperature of the composition but one permitting high melt viscosity at the time of foaming, that is, 165 to 175° C.

The intra-cavity configuration of the pressure molding metal mold, although not particularly limited, is generally such that a plate can be obtained. The pressure molding metal mold must have a structure capable of complete sealing for preventing the leakage of molten resin to outside. Also, use can be made of a frame having a structure capable of complete sealing for preventing the leakage of molten resin to outside. It is preferred from the viewpoint of resin release easiness that the frame have its inner side tapered.

The pressure applied at the pressured melting is generally 50 kg/cm$^2$ or over, preferably 100 to 200 kg/cm$^2$.

The heating period under pressure, although changed depending on the amount of composition fed into the pressure molding metal mold, must be sufficient to cause the composition to melt, reach 165 to 175° C. and undergo a crosslinking reaction and decomposition of the foaming agent (F). The time required for the crosslinking reaction and decomposition of the foaming agent (F), although depending on the temperature, must be at least 10 min.

Opening the pressure molding metal mold after the completion of the crosslinking reaction and decomposition of the foaming agent (F) causes a foaming to occur, so that a crosslinked foam can be obtained.

The process for producing a crosslinked olefin elastomer foam in which the cooling solidified pellets or sheet is used as the noncrosslinked nonfoamed composition for feeding into the pressure molding metal mold is advantageous in that, due to the pellet or sheet form, the noncrosslinked foamable composition has excellent storage stability and is free from time and space restraints.

On the other hand, in the process for producing a crosslinked foam in which the molten composition is used as the noncrosslinked foamable composition for feeding into the pressure molding metal mold, the step of re-heating the pellets or sheet to effect melting can be avoided, so that a crosslinked foam can be obtained within a shorter period.

Thereafter, the thus obtained hot crosslinked foam is immediately transferred into a cooling molding metal mold, in which, under pressure, molding and cooling are simultaneously carried out. Thus, a crosslinked foam is obtained.

The obtained crosslinked foam (hot foam), although its adherence is low because of the crosslinking, must be disposed on, for example, a plate of less adherence and high releasability and immediately transferred into the cooling molding metal mold in order to achieve molding in the cooling molding metal mold.

The cooling molding metal mold is equipped with an embedded cooling pipe for circulating, for example, water inside the cooling molding metal mold. In the present invention, the cooling molding metal mold, although its structure is not particularly limited, generally comprises an upper die and a lower die.

Any excess pressure application is not needed after the completion of crosslinked foam shaping. It is preferred that the pressure application be effected in conformity with the shrinkage of foam made by the cooling.

For obtaining a secondarily compressed crosslinked foam, the thus obtained crosslinked foam is shaved taking into account the configuration of molding metal mold and compression ratio, and the shaved crosslinked foam is transferred into a molding metal mold heated at 150 to 175° C., preferably 155 to 165° C., in which molding under pressure is carried out.

The applied pressure is generally at least 50 kg/cm², preferably in the range of 100 to 200 kg/cm². The heating period under pressure, although depending on the configuration and temperature of molding metal mold, is generally required to be at least 7 min.

Immediately after the completion of the heating, the molding metal mold with the foam accommodated in its cavity is cooled. Thus, a secondarily compressed crosslinked foam is obtained.

It is preferred that the thus obtained secondarily compressed crosslinked foam have a specific gravity of 0.1 to 0.2, a compression set of 20 to 60% and a tear strength of 2.0 to 4.0 kg/cm.

The second to sixth crosslinked olefin elastomer foams and elastomer compositions therefor according to the present invention will be described in detail below.

Second to Sixth Crosslinked Foams

The second crosslinked olefin elastomer foam of the present invention is a crosslinked foam obtained by heating an olefin elastomer composition comprising an ethylene/α-olefin copolymer (A), a modified polyolefin (B), an organic peroxide (D), a crosslinking auxiliary (E) and a foaming agent (F). This ethylene/α-olefin copolymer (A) may be a mixture of an ethylene/α-olefin copolymer (A1) and an ethylene/α-olefin copolymer (A2).

The third crosslinked olefin elastomer foam of the present invention is a crosslinked foam obtained by heating an olefin elastomer composition comprising an ethylene/α-olefin copolymer (A), a high-pressure processed low-density polyethylene (C), an organic peroxide (D), a crosslinking auxiliary (E) and a foaming agent (F).

The fourth crosslinked olefin elastomer foam of the present invention is a crosslinked foam obtained by heating an olefin elastomer composition comprising an ethylene/α-olefin copolymer (A1), an ethylene/α-olefin copolymer (A2), a high-pressure processed low-density polyethylene (C), an organic peroxide (D), a crosslinking auxiliary (E) and a foaming agent (F).

The fifth crosslinked olefin elastomer foam of the present invention is a crosslinked foam obtained by heating an olefin elastomer composition comprising an ethylene/α-olefin copolymer (A), a modified polyolefin (B), a high-pressure processed low-density polyethylene (C), an organic peroxide (D), a crosslinking auxiliary (E) and a foaming agent (F).

The sixth crosslinked olefin elastomer foam of the present invention is a crosslinked foam obtained by heating an olefin elastomer composition comprising an olefin elastomer composition comprising an ethylene/α-olefin copolymer (A1), an ethylene/α-olefin copolymer (A2), a modified polyolefin (B), a high-pressure processed low-density polyethylene (C), an organic peroxide (D), a crosslinking auxiliary (E) and a foaming agent (F).

The second, third, fourth, fifth and sixth elastomer compositions for crosslinked olefin elastomer foams according to the present invention are noncrosslinked nonfoamed compositions which are used in the preparation of the above second, third, fourth, fifth and sixth crosslinked olefin elastomer foams of the present invention, respectively, and which are crosslinked and foamed when heated at given temperature or higher.

The second elastomer composition for crosslinked olefin elastomer foam according to the present invention comprises an ethylene/α-olefin copolymer (A) (or a mixture of an ethylene/α-olefin copolymer (A1) and an ethylene/α-olefin copolymer (A2)), a modified polyolefin (B), an organic peroxide (D), a crosslinking auxiliary (E) and a foaming agent (F).

The third elastomer composition for crosslinked olefin elastomer foam according to the present invention comprises an ethylene/α-olefin copolymer (A), a high-pressure processed low-density polyethylene (C), an organic peroxide (D), a crosslinking auxiliary (E) and a foaming agent (F).

The fourth elastomer composition for crosslinked olefin elastomer foam according to the present invention comprises an ethylene/α-olefin copolymer (A1), an ethylene/α-olefin copolymer (A2), a high-pressure processed low-density polyethylene (C), an organic peroxide (D), a crosslinking auxiliary (E) and a foaming agent (F).

The fifth elastomer composition for crosslinked olefin elastomer foam according to the present invention comprises an ethylene/α-olefin copolymer (A), a modified polyolefin (B), a high-pressure processed low-density polyethylene (C), an organic peroxide (D), a crosslinking auxiliary (E) and a foaming agent (F).

The sixth elastomer composition for crosslinked olefin elastomer foam according to the present invention comprises an ethylene/α-olefin copolymer (A1), an ethylene/α-olefin copolymer (A2), a modified polyolefin (B), a high-pressure processed low-density polyethylene (C), an organic peroxide (D), a crosslinking auxiliary (E) and a foaming agent (F).

(Ethylene/α-olefin Copolymer (A))

The ethylene/α-olefin copolymer (A) for use in the present invention is an amorphous or lowly crystalline random copolymer prepared from ethylene and an α-olefin having 3 to 20 carbon atoms. It is the same as the ethylene/α-olefin copolymer (A) employed in the preparation of the above first crosslinked olefin elastomer foam and elastomer composition therefor according to the present invention.

In the second elastomer composition for crosslinked olefin elastomer foam according to the present invention, the ethylene/α-olefin copolymer (A) is used in an amount of 70 to 95 parts by weight, preferably 80 to 95 parts by weight, and still preferably 85 to 95 parts by weight, per 100 parts by weight of the total of ethylene/α-olefin copolymer (A) and modified polyolefin (B). The use of the ethylene/α-olefin copolymer (A) in the above amounts enables preparation of an elastomer composition from which a crosslinked foam having a low specific gravity and being excellent in compression set, mechanical strength (particularly tear strength) and adhesive strength can be produced.

In the second elastomer composition for crosslinked olefin elastomer foam according to the present invention, the ethylene/α-olefin copolymer (A1) is used in an amount of 5 to 95 parts by weight, preferably 50 to 90 parts by weight, and the ethylene/α-olefin copolymer (A2) is used in an amount of 5 to 95 parts by weight, preferably 10 to 50 parts by weight, per 100 parts by weight of the total of ethylene/α-olefin copolymer (A1) and ethylene/α-olefin copolymer (A2). The use of the ethylene/α-olefin copolymers (A1) and (A2) in the above amounts enables preparation of an elastomer composition from which a crosslinked foam having a low specific gravity and being excellent in compression set and mechanical strength (particularly tear strength) and high in hardness can be produced. In particular, the use of the above long-chain branched ethylene/α-olefin copolymer as either of the ethylene/α-olefin copolymers (A1) and (A2) enables preparation of an elastomer composition from which a crosslinked elastomer foam having a much lower specific gravity and excellent compression set can be produced.

In the third elastomer composition for crosslinked olefin elastomer foam according to the present invention, the ethylene/α-olefin copolymer (A) is used in an amount of 50 to 95 parts by weight, preferably 60 to 90 parts by weight, and still preferably 70 to 85 parts by weight, per 100 parts by weight of the total of ethylene/α-olefin copolymer (A) and high-pressure processed low-density polyethylene (C) The use of the ethylene/α-olefin copolymer (A) in the above amounts enables preparation of an elastomer composition from which a crosslinked foam having a low specific gravity (high expansion) and being excellent in compression set and mechanical strength (particularly tear strength) and high in hardness can be produced.

In the fourth elastomer composition for crosslinked olefin elastomer foam according to the present invention, the ethylene/α-olefin copolymer (A1) is used in an amount of 5 to 90 parts by weight, preferably 40 to 80 parts by weight, and still preferably 50 to 70 parts by weight, per 100 parts by weight of the total of ethylene/α-olefin copolymer (A1), ethylene/α-olefin copolymer (A2) and high-pressure processed low-density polyethylene (C). The use of the ethylene/α-olefin copolymer (A1) in the above amounts enables preparation of an elastomer composition from which a crosslinked foam having a low specific gravity (high expansion) and excellent compression set can be produced.

In the fourth elastomer composition for crosslinked olefin elastomer foam according to the present invention, the ethylene/α-olefin copolymer (A2) is used in an amount of 5 to 90 parts by weight, preferably 10 to 50 parts by weight, and still preferably 15 to 30 parts by weight, per 100 parts by weight of the total of ethylene/α-olefin copolymer (A1), ethylene/α-olefin copolymer (A2) and high-pressure processed low-density polyethylene (C). The use of the ethylene/α-olefin copolymer (A2) in the above amounts enables preparation of an elastomer composition from which a crosslinked foam having a high hardness and excellent tear strength can be produced.

In the fourth elastomer composition for crosslinked olefin elastomer foam according to the present invention, in particular, the use of the above long-chain branched ethylene/α-olefin copolymer as either of the ethylene/α-olefin copolymers (A1) and (A2) enables preparation of an elastomer composition from which a crosslinked elastomer foam having a much lower specific gravity (higher expansion) and excellent compression set can be produced.

In the fifth elastomer composition for crosslinked olefin elastomer foam according to the present invention, the ethylene/α-olefin copolymer (A) is used in an amount of 20 to 90 parts by weight, preferably 50 to 80 parts by weight, and still preferably 60 to 80 parts by weight, per 100 parts by weight of the total of ethylene/α-olefin copolymer (A), modified polyolefin (B) and high-pressure processed low-density polyethylene (C). The use of the ethylene/α-olefin copolymer (A) in the above amounts enables preparation of an elastomer composition from which a crosslinked foam having a low specific gravity (high expansion) and excellent compression set can be produced.

In the sixth elastomer composition for crosslinked olefin elastomer foam according to the present invention, the ethylene/α-olefin copolymer (A1) is used in an amount of 5 to 85 parts by weight, preferably 35 to 75 parts by weight, and still preferably 50 to 65 parts by weight, per 100 parts by weight of the total of ethylene/α-olefin copolymer (A1), ethylene/α-olefin copolymer (A2), modified polyolefin (B) and high-pressure processed low-density polyethylene (C). The use of the ethylene/α-olefin copolymer (A1) in the above amounts enables preparation of an elastomer composition from which a crosslinked foam having a low specific gravity (high expansion) and excellent compression set can be produced.

In the sixth elastomer composition for crosslinked olefin elastomer foam according to the present invention, the ethylene/α-olefin copolymer (A2) is used in an amount of 5 to 85 parts by weight, preferably 10 to 50 parts by weight, and still preferably 15 to 30 parts by weight, per 100 parts by weight of the total of ethylene/α-olefin copolymer (A1), ethylene/α-olefin copolymer (A2), modified polyolefin (B) and high-pressure processed low-density polyethylene (C). The use of the ethylene/α-olefin copolymer (A2) in the above amounts enables preparation of an elastomer composition from which a crosslinked foam having a high hardness and excellent tear strength can be produced.

In the sixth elastomer composition for crosslinked olefin elastomer foam according to the present invention, in particular, the use of the above long-chain branched ethylene/α-olefin copolymer as either of the ethylene/α-olefin copolymers (A1) and (A2) enables preparation of an elastomer composition from which a crosslinked elastomer foam having a much lower specific gravity (higher expansion) and excellent compression set can be produced.

(Modified Polyolefin (B))

The modified polyolefin (B) for use in the present invention is a graft modification product obtained by grafting a polyolefin with an unsaturated carboxylic acid or a derivative thereof.

The polyolefin prior to graft modification for use in the present invention is preferably, for example, an ethylene/α-olefin random copolymer prepared from ethylene and an α-olefin having 3 to 20 carbon atoms.

The particular α-olefin having 3 to 20 carbon atoms can be the same as aforementioned with respect to the formation of ethylene/α-olefin copolymer (A). In this invention, an α-olefin having 3 to 10 carbon atoms is preferred. Especially, propylene, 1-butene, 1-hexene and 1-octene are preferred. These α-olefins can be used either individually or in combination.

The density (ASTM D 1505) of this ethylene/α-olefin random copolymer is in the range of 0.86 to 0.93 g/cm$^3$, preferably 0.87 to 0.92 g/cm$^3$, and still preferably 0.88 to 0.92 g/cm$^3$. The use of a modified ethylene/α-olefin random copolymer obtained by grafting an ethylene/α-olefin random copolymer whose density falls within the above ranges with an unsaturated carboxylic acid or a derivative thereof enables preparation of an elastomer composition from which a crosslinked elastomer foam excellent in tear strength and adhesion can be produced.

The melt flow rate (MFR measured at 190° C. under a load of 2.16 kg in accordance with ASTM D 1238) of this unmodified ethylene/α-olefin random copolymer is in the range of 0.1 to 100 g/10 min, preferably 0.5 to 50 g/10 min, and still preferably 0.5 to 20 g/10 min. The modified ethylene/α-olefin random copolymer obtained from unmodified ethylene/α-olefin random copolymer whose MFR falls within the above ranges has excellent blendability with the ethylene/α-olefin copolymer (A). Further, the use of this modified ethylene/α-olefin random copolymer enables improvement of adhesive strength and mechanical strength.

The unmodified ethylene/α-olefin random copolymer generally has a crystallinity, as measured by X-ray diffractometry, of 40% or below, preferably 10 to 30%. The use of the modified ethylene/α-olefin random copolymer obtained from unmodified ethylene/α-olefin random copolymer whose crystallinity is 40% or below enables preparation of an elastomer composition having excellent impact resistance.

The unmodified ethylene/α-olefin random copolymer having the above properties can be produced by the customary copolymerization method, in which random copolymerization of ethylene and an α-olefin having 3 to 20 carbon atoms is performed in the presence of, for example, a vanadium catalyst consisting of a soluble vanadium compound and an alkylaluminum halide compound or a zirconium catalyst consisting of a metallocene compound of zirconium and an organoaluminum oxy compound.

Examples of suitable soluble vanadium compounds for use in the vanadium catalyst include vanadium tetrachloride, vanadium oxytrichloride, monoethoxyvanadium dichloride, vanadium triacetylacetonate and oxyvanadium triacetylacetonate.

Examples of suitable alkylaluminum halide compounds for use in the vanadium catalyst include ethylaluminum dichloride, diethylaluminum monochloride, ethylaluminum sesquichloride, diethylaluminum monobromide, diisobutylaluminum monochloride, isobutylaluminum dichloride and isobutylaluminum sesquichloride.

Examples of suitable zirconium metallocene compounds for use in the zirconium catalyst include:
ethylenebis(indenyl)zirconium dibromide,
dimethylsilylenebis(2-methylindenyl)zirconium dichloride,
bis(cyclopentadienyl)zirconium dibromide, and
bis(dimethylcyclopentadienyl)zirconium dichloride.

Examples of suitable organoaluminum oxy compounds for use in the zirconium catalyst include aluminooxane and benzene-insoluble organoaluminum oxy compounds.

The zirconium catalyst may contain an organoaluminum compound together with the metallocene compound of zirconium and the organoaluminum oxy compound.

Examples of suitable organoaluminum compounds include triisobutylaluminum, dimethylaluminum chloride and methylaluminum sesquichloride.

This polymerization can be performed in a solution, a suspension or an intermediate form. In any case, it is preferred that an inert solvent be used as a reaction medium.

The modified polyolefin (B) for use in this invention can be obtained by grafting the above unmodified ethylene/α-olefin random copolymer with a given amount of an unsaturated carboxylic acid or a derivative thereof.

In the modified polyolefin (B) for use in this invention, the amount of graft of unsaturated carboxylic acid or derivative thereof is in the range of 0.1 to 4.0% by weight, preferably 0.5 to 2.5% by weight, per 100% by weight of unmodified ethylene/α-olefin random copolymer.

The modified polyolefin (B) whose graft amount is in the above range is excellent in the dispersibility in the elastomer composition for crosslinked olefin elastomer foam, has excellent thermal stability and is free from coloring of molten resin. Further, the use of this modified polyolefin (B) enables preparation of an elastomer composition from which a crosslinked foam excellent in mechanical strength can be produced.

Examples of suitable unsaturated carboxylic acids for use in the above modification include acrylic acid, maleic acid, fumaric acid, tetrahydrophthalic acid, itaconic acid, citraconic acid, crotonic acid, isocrotonic acid and Nadic acid (trade name, endocis-bicyclo(2,2,1)hept-5-ene-2,3-dicarboxylic acid).

Examples of suitable derivatives of unsaturated carboxylic acids include acid halide compounds, amide compounds, imide compounds, acid anhydrides and ester compounds derived from the above unsaturated carboxylic acids. Specific examples thereof include maleyl chloride, maleimide, maleic anhydride, citraconic anhydride, monomethyl maleate, dimethyl maleate and glycidyl maleate. Of these, unsaturated dicarboxylic acids and anhydrides thereof are preferred. Maleic acid, Nadic acid (trade name) and anhydrides thereof are especially preferred.

The above modified polyolefin (B) can be produced by various customary processes such as:
(1) process in which an unsaturated carboxylic acid or a derivative thereof is added to the above unmodified ethylene/α-olefin random copolymer in molten form and a graft copolymerization is carried out; and
(2) process in which the above unmodified ethylene/α-olefin random copolymer is dissolved in a solvent, an unsaturated carboxylic acid or a derivative thereof is added to the solution and a graft copolymerization is carried out.

In all these processes, it is preferred from the viewpoint of efficient graft copolymerization of a graft monomer such as the above unsaturated carboxylic acid that the grafting reaction be performed in the presence of a radical initiator.

An organic peroxide, an azo compound or the like can be used as the radical initiator. Examples of suitable radical initiators include:
organic peroxides such as benzoyl peroxide, dichlorobenzoyl peroxide, dicumyl peroxide, di-tert-butyl peroxide, 2,5-dimethyl-2,5-di(peroxidobenzoato)hexyne-3, 1,4-bis(tert-butylperoxyisopropyl)benzene, lauroyl peroxide, tert-butyl peracetate, 2,5-dimethyl-2,5-di(tert-butylperoxido)hexyne-3, 2,5-dimethyl-2,5-di(tert-butylperoxido)hexane, tert-butyl perbenzoate, tert-butyl perphenylacetate, tert-butyl perisobutylate, tert-butyl per-sec-octoate, tert-butyl perpivalate, cumyl perpivalate and tert-butyl perdiethylacetate; and
azo compounds such as azobisisobutyronitrile and dimethyl azoisobutylate. Of these, dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene are preferably used.

The above radical initiator is generally used in an amount of 0.01 to 0.10 parts by weight, preferably 0.02 to 0.08 parts by weight, and still preferably 0.02 to 0.05 parts by weight, per 100 parts by weight of unmodified ethylene/α-olefin random copolymer.

In both the graft reaction in which the above radical initiator is used and the graft reaction in which no radical initiator is used, the reaction temperature is generally set at 60 to 350° C., preferably 150 to 300° C.

In the second elastomer composition for crosslinked olefin elastomer foam according to the present invention, the modified polyolefin (B) is used in an amount of 5 to 30 parts by weight, preferably 5 to 20 parts by weight, and still preferably 5 to 15 parts by weight, per 100 parts by weight of the total of ethylene/α-olefin copolymer (A) (or mixture of ethylene/α-olefin copolymer (A1) and ethylene/α-olefin copolymer (A2)) and modified polyolefin (B). The use of the modified polyolefin (B) in the above amounts enables preparation of an elastomer composition from which a crosslinked foam having a low specific gravity and being excellent in compression set, mechanical strength (particularly tear strength) and adhesive strength can be produced.

In the fifth elastomer composition for crosslinked olefin elastomer foam according to the present invention, the modified polyolefin (B) is used in an amount of 5 to 30 parts by weight, preferably 5 to 20 parts by weight, and still preferably 5 to 15 parts by weight, per 100 parts by weight of the total of ethylene/α-olefin copolymer (A), modified polyolefin (B) and high-pressure processed low-density polyethylene (C). The use of the modified polyolefin (B) in the above amounts enables preparation of an elastomer composition from which a crosslinked foam having a high specific gravity and being excellent in compression set, tear strength and adhesion and high in hardness can be produced.

In the sixth elastomer composition for crosslinked olefin elastomer foam according to the present invention, the modified polyolefin (B) is used in an amount of 5 to 30 parts by weight, preferably 5 to 20 parts by weight, and still preferably 5 to 15 parts by weight, per 100 parts by weight of the total of ethylene/α-olefin copolymer (A1), ethylene/α-olefin copolymer (A2), modified polyolefin (B) and high-pressure processed low-density polyethylene (C). The use of the modified polyolefin (B) in the above amounts enables preparation of an elastomer composition from which a crosslinked foam having a high specific gravity and being excellent in compression set, tear strength and adhesion and high in hardness can be produced.

(High-Pressure Processed Low-Density Polyethylene (C))

The high-pressure processed low-density polyethylene (C) for use in the present invention is an ethylene homopolymer or a copolymer of ethylene and an α-olefin having 3 to 20 carbon atoms. The density thereof is in the range of 0.91 to less than 0.93 g/cm$^3$, preferably 0.91 to 0.92 g/cm$^3$.

Examples of suitable α-olefins include propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyl-1-octene, trimethyl-1-heptene, ethyl-1-octene, methylethyl-1-heptene, diethyl-1-hexene, 1-dodecene and 1-hexadecene. These α-olefins can be used either individually or in combination.

The melt flow rate (MFR measured at 190° C. under a load of 2.16 kg in accordance with ASTM D 1238) of the high-pressure processed low-density polyethylene (C) for use in the present invention is in the range of 0.1 to 50 g/10 min, preferably 0.5 to 50 g/10 min, and still preferably 0.5 to 20 g/10 min.

In the third elastomer composition for crosslinked olefin elastomer foam according to the present invention, the high-pressure processed low-density polyethylene (C) is used in an amount of 5 to 50 parts by weight, preferably 10 to 40 parts by weight, and still preferably 15 to 30 parts by weight, per 100 parts by weight of the total of ethylene/α-olefin copolymer (A) and high-pressure processed low-density polyethylene (C). The use of the high-pressure processed low-density polyethylene (C) in the above amounts enables preparation of an elastomer composition from which a crosslinked foam having a high hardness and excellent tear strength can be produced.

In the fourth elastomer composition for crosslinked olefin elastomer foam according to the present invention, the high-pressure processed low-density polyethylene (C) is used in an amount of 5 to 50 parts by weight, preferably 10 to 40 parts by weight, and still preferably 15 to 30 parts by weight, per 100 parts by weight of the total of ethylene/α-olefin copolymer (A1), ethylene/α-olefin copolymer (A2) and high-pressure processed low-density polyethylene (C). The use of the high-pressure processed low-density polyethylene (C) in the above amounts enables preparation of an elastomer composition from which a crosslinked foam having a high hardness and excellent tear strength can be produced.

In the fifth elastomer composition for crosslinked olefin elastomer foam according to the present invention, the high-pressure processed low-density polyethylene (C) is used in an amount of 5 to 50 parts by weight, preferably 10 to 40 parts by weight, and still preferably 15 to 30 parts by weight, per 100 parts by weight of the total of ethylene/α-olefin copolymer (A), modified polyolefin (B) and high-pressure processed low-density polyethylene (C). The use of the high-pressure processed low-density polyethylene (C) in the above amounts enables preparation of an elastomer composition from which a crosslinked foam having a high hardness and excellent tear strength can be produced.

In the sixth elastomer composition for crosslinked olefin elastomer foam according to the present invention, the high-pressure processed low-density polyethylene (C) is used in an amount of 5 to 50 parts by weight, preferably 10 to 40 parts by weight, and still preferably 15 to 30 parts by weight, per 100 parts by weight of the total of ethylene/α-olefin copolymer (A1), ethylene/α-olefin copolymer (A2), modified polyolefin (B) and high-pressure processed low-density polyethylene (C). The use of the high-pressure processed low-density polyethylene (C) in the above amounts enables preparation of an elastomer composition from which a crosslinked foam having a high hardness and excellent tear strength can be produced.

(Organic Peroxide (D))

The organic peroxide (D) for use as a crosslinking agent in this invention is the same as employed in the preparation of the above first crosslinked olefin elastomer foam and elastomer composition therefor according to the present invention.

In the second elastomer composition for crosslinked olefin elastomer foam according to the present invention, the organic peroxide (D) is generally used in an amount of 0.1 to 1.5 parts by weight, preferably 0.2 to 1.0 part by weight, per 100 parts by weight of the total of ethylene/α-olefin copolymer (A) (or mixture of ethylene/α-olefin copolymer (A1) and ethylene/α-olefin copolymer (A2)) and modified polyolefin (B).

In the third elastomer composition for crosslinked olefin elastomer foam according to the present invention, the organic peroxide (D) is generally used in an amount of 0.1 to 1.5 parts by weight, preferably 0.2 to 1.0 part by weight, per 100 parts by weight of the total of ethylene/α-olefin copolymer (A) and high-pressure processed low-density polyethylene (C).

In the fourth elastomer composition for crosslinked olefin elastomer foam according to the present invention, the organic peroxide (D) is generally used in an amount of 0.1 to 1.5 parts by weight, preferably 0.2 to 1.0 part by weight, per 100 parts by weight of the total of ethylene/α-olefin copolymer (A1), ethylene/α-olefin copolymer (A2) and high-pressure processed low-density polyethylene (C).

In the fifth elastomer composition for crosslinked olefin elastomer foam according to the present invention, the organic peroxide (D) is generally used in an amount of 0.1 to 1.5 parts by weight, preferably 0.2 to 1.0 part by weight, per 100 parts by weight of the total of ethylene/α-olefin copolymer (A), modified polyolefin (B) and high-pressure processed low-density polyethylene (C).

In the sixth elastomer composition for crosslinked olefin elastomer foam according to the present invention, the organic peroxide (D) is generally used in an amount of 0.1 to 1.5 parts by weight, preferably 0.2 to 1.0 part by weight, per 100 parts by weight of the total of ethylene/α-olefin copolymer (A1), ethylene/α-olefin copolymer (A2), modified polyolefin (B) and high-pressure processed low-density polyethylene (C).

The use of the organic peroxide (D) together with the crosslinking auxiliary (E) in the above amounts enables obtaining a crosslinked foam with appropriate crosslink structure.

(Crosslinking Auxiliary (E))

The crosslinking auxiliary (E) for use in this invention is the same as employed in the preparation of the above first crosslinked olefin elastomer foam and elastomer composition therefor according to the present invention.

In the present invention, the crosslinking auxiliary (E) is preferably used at a weight ratio of crosslinking auxiliary (E) to organic peroxide (D) ((E)/(D)) of 1/10 to 5/1, still preferably 1/8 to 3/1, and optimally 1/5 to 2/1.

(Foaming Agent (F))

The foaming agent (F) for use in this invention is the same as employed in the preparation of the above first crosslinked olefin elastomer foam and elastomer composition therefor according to the present invention.

In the second elastomer composition for crosslinked olefin elastomer foam according to the present invention, the foaming agent (F) is generally used in an amount of 3 to 20 parts by weight, preferably 5 to 15 parts by weight, per 100 parts by weight of the total of ethylene/α-olefin copolymer (A) (or mixture of ethylene/α-olefin copolymer (A1) and ethylene/α-olefin copolymer (A2)) and modified polyolefin (B).

In the third elastomer composition for crosslinked olefin elastomer foam according to the present invention, the foaming agent (F) is generally used in an amount of 3 to 20 parts by weight, preferably 5 to 15 parts by weight, per 100 parts by weight of the total of ethylene/α-olefin copolymer (A) and high-pressure processed low-density polyethylene (C).

In the fourth elastomer composition for crosslinked olefin elastomer foam according to the present invention, the foaming agent (F) is generally used in an amount of 3 to 20 parts by weight, preferably 5 to 15 parts by weight, per 100 parts by weight of the total of ethylene/α-olefin copolymer (A1), ethylene/α-olefin copolymer (A2) and high-pressure processed low-density polyethylene (C).

In the fifth elastomer composition for crosslinked olefin elastomer foam according to the present invention, the foaming agent (F) is generally used in an amount of 3 to 20 parts by weight, preferably 5 to 15 parts by weight, per 100 parts by weight of the total of ethylene/α-olefin copolymer (A), modified polyolefin (B) and high-pressure processed low-density polyethylene (C).

In the sixth elastomer composition for crosslinked olefin elastomer foam according to the present invention, the foaming agent (F) is generally used in an amount of 3 to 20 parts by weight, preferably 5 to 15 parts by weight, per 100 parts by weight of the total of ethylene/α-olefin copolymer (A1), ethylene/α-olefin copolymer (A2), modified polyolefin (B) and high-pressure processed low-density polyethylene (C).

The use of the foaming agent (F) in the above amounts enables obtaining a foam molding with high expansion ratio and high closed cell ratio. The amount of added foaming agent (F) is decided taking into account the expansion ratio of crosslinked foam.

Production of Second to Sixth Elastomer Compositions

Each of the above second, third, fourth, fifth and sixth elastomer compositions for crosslinked olefin elastomer foam according to the present invention is a noncrosslinked nonfoamed composition, which may be in molten form or in the form of pellets or a sheet obtained by cooling the melt to effect solidification.

Pellets of the second elastomer composition for crosslinked olefin elastomer foam according to the present invention can be produced by, for example, mixing together the above ethylene/α-olefin copolymer (A) (or mixture of ethylene/α-olefin copolymer (A1) and ethylene/α-olefin copolymer (A2)), modified polyolefin (B), organic peroxide (D), crosslinking auxiliary (E) and foaming agent (F) in the above amounts by means of Henschel mixer or the like, and melting and plasticizing the mixture by means of a blender such as a banbury mixer, an extruder or the like at such a temperature that the foaming agent (F) and organic peroxide (D) are not decomposed to thereby effect homogeneous mixing and dispersion, followed by pelletization by means of a pelletizer.

Pellets of the third, fourth, fifth and sixth elastomer compositions for crosslinked olefin elastomer foam according to the present invention can be produced in the same manner as described above with respect to the production of pellets of the second elastomer composition for crosslinked olefin elastomer foam according to the present invention.

These compositions can optionally be loaded with various additives such as such as a filler, a heat stabilizer, a weathering stabilizer, a flame retarder, a hydrochloric acid absorber and a pigment in addition to the above components to an extent such that the object of the present invention is not departed from.

On the other hand, sheets of the second, third, fourth, fifth and sixth elastomer compositions for crosslinked olefin elastomer foam according to the present invention can be produced by, for example, sheeting the above obtained pellets of the compositions by the use of an extruder or a calendering machine. Alternatively, the foamable sheet in the noncrosslinked and nonfoamed state can be produced by blending together composition components by means of, for example, Brabender Plastograph and, thereafter, sheeting the blend by means of calender rolls or a press molding machine. Furthermore, the foamable sheet can be produced by blending composition components by means of an extruder and, thereafter, sheeting the blend through T dies or annular dies.

Production of Second to Sixth Crosslinked Olefin Elastomer Foams

The second, third, fourth, fifth and sixth crosslinked olefin elastomer foams of the present invention can be produced from the above second, third, fourth, fifth and sixth elastomer compositions for crosslinked olefin elastomer foam according to the present invention, respectively, in the same manner as described above with respect to the production of the first crosslinked olefin elastomer foam of the present invention.

It is preferred that each of the second to sixth crosslinked olefin elastomer foams of the present invention which are produced in the above manner have a specific gravity (JIS K 7112) of 0.05 to 0.2, an expansion ratio of 8 to 15, a compression set (JIS K 6301) of 30 to 60% and a tear strength (BS5131-2.6) of 1.5 to 2.5 kg/cm.

Secondarily compressed crosslinked foams can be obtained from the above crosslinked foams by the aforementioned method. Each of the secondarily compressed crosslinked foams preferably has a specific gravity of 0.1 to 0.2, a compression set of 20 to 60% and a tear strength of 2.0 to 4.0 kg/cm.

The seventh crosslinked olefin elastomer foam and elastomer composition therefor according to the present invention will be described in detail below.

Seventh Crosslinked Foam

The seventh crosslinked foam of the present invention is a crosslinked foam obtained by heating an olefin elastomer composition comprising an ethylene/α-olefin copolymer (G), a polypropylene (H), an organic peroxide (D), a crosslinking auxiliary (E) and a foaming agent (F).

The seventh elastomer composition for crosslinked olefin elastomer foam according to the present invention is a noncrosslinked nonfoamed composition which is crosslinked and foamed when heated at given temperature or higher, and comprises a specified ethylene/α-olefin copolymer (G), a polypropylene (H), an organic peroxide (D), a crosslinking auxiliary (E) and a foaming agent (F).

Ethylene/α-olefin Copolymer (G)

The ethylene/α-olefin copolymer (G) for use in the present invention is an amorphous or lowly crystalline random copolymer prepared from ethylene and an α-olefin having 3 to 20 carbon atoms. It is preferably a soft ethylene/α-olefin copolymer having a density (ASTM D 1505) of 0.88 to 0.92 g/cm$^3$ and a melt flow rate (MFR measured at 190° C. under a load of 2.16 kg in accordance with ASTM D 1238) of 0.1 to 50 g/10 min, especially 0.5 to 20 g/10 min.

The α-olefin copolymerized with ethylene is an α-olefin having 3 to 20 carbon atoms, which can be selected from among, for example, propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene and 4-methyl-1-pentene. Of these, α-olefins having 3 to 10 carbon atoms are preferred. Propylene, 1-butene, 1-hexene and 1-octene are especially preferred. These α-olefins can be used either individually or in combination.

It is preferred that the ethylene/α-olefin copolymer (G) contain units derived from ethylene in an amount of 85 to 93 mol % and units derived from α-olefins having 3 to 20 carbon atoms in an amount of 7 to 15 mol %.

The composition of the ethylene/α-olefin copolymer (G) is generally determined by homogeneously dissolving about 200 mg of the copolymer in 1 ml of hexachlorobutadiene in a sample tube of 10 mm diameter to thereby obtain a sample solution and subjecting the sample solution to $^{13}$C-NMR spectroscopy under the conditions such that the measuring temperature is 120° C., the measuring frequency 25.05 MHz, the spectrum width 1500 Hz, the pulse cycle time 4.2 sec and the pulse width 6 μsec.

Furthermore, the ethylene/α-olefin copolymer (G) may contain units derived from other polymerizable monomers than the above monomers to an extent such that the object of the present invention is not departed from.

Examples of suitable ethylene/α-olefin copolymers (G) include ethylene/propylene random copolymer, ethylene/1-butene random copolymer, ethylene/propylene/1-butene random copolymer, ethylene/propylene/ethylidenenorbornene random copolymer, ethylene/1-hexene random copolymer and ethylene/1-octene random copolymer. Of these, ethylene/propylene random copolymer, ethylene/1-butene random copolymer, ethylene/1-hexene random copolymer and ethylene/1-octene random copolymer are preferred. These copolymers may be used in combination.

The ethylene/α-olefin copolymer (G) for use in this invention generally has a crystallinity, as measured by X-ray diffractometry, of 40% or below, preferably 10 to 30%.

This ethylene/α-olefin copolymer (G) can be produced by the conventional process in which use is made of a vanadium catalyst, a titanium catalyst, a metallocene catalyst or the like.

The ethylene/α-olefin copolymer (G) is used in an amount of 70 to 98 parts by weight, preferably 80 to 95 parts by weight, per 100 parts by weight of the total of ethylene/α-olefin copolymer (G) and polypropylene (H). The use of the ethylene/α-olefin copolymer (G) in the above amounts enables preparation of a composition from which a crosslinked foam having a low specific gravity and being excellent in the balance of flexibility, surface hardness, abrasion resistance, tear strength property and heat resistance can be produced.

Polypropylene (H)

The polypropylene (H) for use in the present invention can be any of propylene homopolymer, propylene block copolymers and propylene/α-olefin random copolymers. These can be used either individually or in combination.

The melt flow rate (MFR measured at 230° C. under a load of 2.16 kg in accordance with ASTM D 1238) of the propylene homopolymer for use in the present invention is generally in the range of 0.5 to 50 g/10 min, preferably 1 to 20 g/10 min.

The propylene block copolymer for use in the present invention is generally one prepared from propylene and ethylene or an α-olefin having 4 to 10 carbon atoms, and the melt flow rate (MFR measured at 230° C. under a load of 2.16 kg in accordance with ASTM D 1238) thereof is generally in the range of 0.5 to 50 g/10 min, preferably 1 to 20 g/10 min.

The α-olefin having 4 to 10 carbon atoms for block copolymerization with propylene can be, for example, any of 1-butene, 1-pentene, 1-hexene, 1-heptene, 1-octene, 1-nonene, 1-decene and 4-methyl-1-pentene. Of these, ethylene, 1-butene, 1-hexene and 1-octene are preferred. The α-olefins can be used either individually or in combination.

It is preferred that the propylene block copolymer contain units derived from propylene in an amount of 80 to 95 mol % and units derived from ethylene or an α-olefin having 4 to 10 carbon atoms in an amount of 5 to 20 mol %.

The propylene block copolymer is preferably a propylene/ethylene block copolymer.

The propylene/α-olefin random copolymer for use in the present invention is an amorphous or lowly crystalline random copolymer prepared from propylene and ethylene and/or an α-olefin having 4 to 20 carbon atoms. It is preferably a soft propylene/α-olefin random copolymer having a melt flow rate (MFR measured at 230° C. under a load of 2.16 kg in accordance with ASTM D 1238) of 0.5 to 50 g/10 min, especially 1 to 20 g/10 min.

As the α-olefin having 4 to 20 carbon atoms copolymerized with propylene, there can be mentioned, for example, α-olefins having 4 to 20 carbon atoms such as 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene and 4-methyl-1-pentene. Of the α-olefins copolymerized with propylene, ethylene and α-olefins having 4 to 10 carbon atoms are preferred. Ethylene, 1-butene, 1-hexene and 1-octene are especially preferred. These α-olefins can be used either individually or in combination.

It is preferred that the propylene/α-olefin random copolymer contain units derived from propylene in an amount of 70 to 98 mol % and units derived from ethylene and α-olefins having 4 to 20 carbon atoms in an amount of 2 to 30 mol %.

Examples of suitable propylene/α-olefin random copolymers include propylene/ethylene random copolymer, propylene/1-butene random copolymer, propylene/ethylene/1-butene random copolymer, propylene/ethylene/ethylidenenorbornene random copolymer, propylene/1-hexene random copolymer and propylene/1-octene random copolymer. Of these, propylene/ethylene random copolymer, propylene/1-butene random copolymer, propylene/1-hexene random copolymer and propylene/1-octene random copolymer are preferred. These copolymers may be used in combination.

These propylene/α-olefin random copolymers generally have a melting point, as measured by the DSC method, of 150° C. or below, preferably 125 to 145° C.

In the present invention, use is made of polypropylene (H) having such a melt flow rate that the melt flow rate (MFR measured at 230° C. under a load of 2.16 kg in accordance with ASTM D 1238) of the mixture of ethylene/α-olefin copolymer (G) and polypropylene (H) is in the range of 0.1 to 10 g/10 min, preferably 0.5 to 10 g/10 min.

The polypropylene (H) is used in an amount of 2 to 30 parts by weight, preferably 5 to 20 parts by weight, per 100 parts by weight of the total of ethylene/α-olefin copolymer (G) and polypropylene (H). The use of the polypropylene (H) in the above amounts enables preparation of a composition from which a foam having a low specific gravity and being excellent in the balance of flexibility, surface hardness, abrasion resistance, tear strength property and heat resistance can be produced.

Organic Peroxide (D)

The organic peroxide (D) for use as a crosslinking agent in this invention is the same as employed in the preparation of the above first crosslinked olefin elastomer foam and elastomer composition therefor according to the present invention.

In the present invention, the organic peroxide (D) is generally used in an amount of 0.1 to 1.5 parts by weight, preferably 0.2 to 1.0 part by weight, per 100 parts by weight of the total of ethylene/α-olefin copolymer (G) and polypropylene (H). The use of the organic peroxide (D) together with the crosslinking auxiliary (E) in the above amounts enables obtaining a crosslinked foam with appropriate crosslink structure.

Crosslinking Auxiliary (E)

The crosslinking auxiliary (E) for use in this invention is the same as employed in the preparation of the above first crosslinked olefin elastomer foam and elastomer composition therefor according to the present invention.

In the present invention, the crosslinking auxiliary (E) is preferably used at a weight ratio of crosslinking auxiliary (E) to organic peroxide (D) ((E)/(D)) of 1/10 to 5/1, still preferably 1/8 to 3/1, and optimally 1/5 to 2/1.

Foaming Agent (F)

The foaming agent (F) for use in this invention is the same as employed in the preparation of the above first crosslinked olefin elastomer foam and elastomer composition therefor according to the present invention.

In the present invention, the foaming agent (F) is generally used in an amount of 3 to 20 parts by weight, preferably 5 to 15 parts by weight, per 100 parts by weight of the total of ethylene/α-olefin copolymer (G) and polypropylene (H). The use of the foaming agent (F) in the above amounts enables obtaining a foam molding with high expansion ratio and high closed cell ratio. The amount of added foaming agent (F) is decided taking into account the expansion ratio of crosslinked foam.

Production of Seventh Elastomer Composition

The seventh elastomer composition for crosslinked olefin elastomer foam according to the present invention is a noncrosslinked nonfoamed composition, which may be in molten form or in the form of pellets or a sheet obtained by cooling the melt to effect solidification.

Pellets of the seventh elastomer composition for crosslinked olefin elastomer foam according to the present invention can be produced by, for example, mixing together the above ethylene/α-olefin copolymer (G), polypropylene (H), organic peroxide (D), crosslinking auxiliary (E) and foaming agent (F) in the above amounts by means of Henschel mixer or the like, and melting and plasticizing the mixture by means of a blender such as a banbury mixer, an extruder or the like at such a temperature that the foaming agent (F) and organic peroxide (D) are not decomposed to thereby effect homogeneous mixing and dispersion, followed by pelletization by means of a pelletizer.

This composition can optionally be loaded with various additives such as such as a filler, a heat stabilizer, a weathering stabilizer, a flame retarder, a hydrochloric acid absorber and a pigment in addition to the above components to an extent such that the object of the present invention is not departed from.

On the other hand, a sheet of the seventh elastomer composition for crosslinked olefin elastomer foam according to the present invention can be produced by, for example, sheeting the above obtained pellets of the composition by the use of an extruder or a calendering machine. Alternatively, the foamable sheet in the noncrosslinked and nonfoamed state can be produced by blending together composition components by means of, for example, Brabender Plastograph and, thereafter, sheeting the blend by means of calender rolls or a press molding machine. Furthermore, the foamable sheet can be produced by blending composition components by means of an extruder and, thereafter, sheeting the blend through T dies or annular dies.

Production of Seventh Crosslinked Olefin Elastomer Foam

The seventh crosslinked olefin elastomer foam of the present invention can be produced from the above seventh elastomer composition for crosslinked olefin elastomer foam according to the present invention, for example, in the same manner as described above with respect to the production of the first crosslinked olefin elastomer foam of the present invention.

It is preferred that the seventh crosslinked olefin elastomer foam of the present invention which is produced in the above manner have a specific gravity (JIS K 7112) of 0.05 to 0.2, an expansion ratio of 8 to 15, a compression set (JIS K 6301) of 30 to 60% and a tear strength (BS5131-2.6) of 1.5 to 2.5 kg/cm.

Secondarily compressed crosslinked foam can be obtained from the above crosslinked foam by the aforementioned method. The secondarily compressed crosslinked foam preferably has a specific gravity of 0.1 to 0.2, a compression set of 20 to 60% and a tear strength of 2.0 to 4.0 kg/cm.

EFFECT OF THE INVENTION

The crosslinked olefin elastomer foam of the present invention has a high expansion ratio, is free from surface roughening attributed to defoaming, realizes a soft touch, exhibits a low compression set and is excellent in tear strength property and heat resistance.

Also, the secondarily compressed crosslinked foam, that is, other crosslinked olefin elastomer foam of the present invention is free from surface roughening attributed to defoaming, realizes a soft touch, exhibits a low compression set and is excellent in tear strength property and heat resistance.

The elastomer composition for crosslinked olefin elastomer foam according to the present invention enables producing the crosslinked olefin elastomer foam (including the secondarily compressed crosslinked foam) of the present invention which can exert these effects.

The crosslinked olefin elastomer foam (including the secondarily compressed crosslinked foam) of the present invention is suitable to application in automobile parts such as weatherstrips and side shields, foot gears such as shoe soles and sandals, cable coverings, sports goods, grips, gaskets, construction materials, leisure goods, etc.

EXAMPLE

The present invention will further be illustrated below with reference to the following Examples which in no way limit the scope of the invention.

With respect to the foams obtained in the Examples and Comparative Examples, the expansion ratio, compression set and tear strength were measured by the following methods, and the soft touch and foaming uniformity were evaluated by the following methods.

(1) Expansion ratio:

The expansion ratio is the quotient obtained by dividing the density of nonfoamed item assumed to be 980 kg/m$^3$ by the apparent density of foam.

(2) Compression set:

The compression set was determined by carrying out a compression set test in accordance with Japanese Industrial Standard (JIS) K 6301 under conditions such that a compression of 50% compression ratio was applied at 50° C. for 6 hr.

(3) Tear strength:

The tear strength was determined by carrying out a tear strength test at a pulling speed of 10 mm/min in accordance with BS5131-2.6.

(4) Soft touch:

Hand was put on a foam surface, and the soft touch of the foam was rated on the basis of the sensation into the following 5 grades.
Five-Grade Rating
  5: surface is even, giving soft sensation;
  4: surface is slightly sandy, still giving soft sensation;
  3: intermediate between grades 2 and 4;
  2: surface is sandy, giving slightly hard sensation; and
  1: surface is rough, giving resin-like hard sensation.

(5) Foaming uniformity:

The state of a foam section was visually inspected, and the foaming uniformity was rated on the basis of the state into the following four grades.
Four-Grade Rating
  AA: both cell size and morphology are highly uniform,
  A: both cell size and morphology are uniform,
  B: both cell size and morphology are slightly nonuniform, and
  C: both cell size and morphology are extremely irregular.

Production Example 1

(Production of long-chain branched ethylene/1-butene copolymer (A-3))

(Preparation of catalyst solution)

0.63 mg of rac-dimethylsilylene-bis{1-(2-methyl-4-phenylindenyl)}zirconium dichloride was placed in a glass flask satisfactorily purged with nitrogen. Further, 1.57 ml of a toluene solution of methylaluminooxane (A1: 0.13 mmol/lit.) and 2.43 ml of toluene were added thereto, thereby obtaining a catalyst solution.

(Polymerization)

912 ml of hexane and 86 ml of 1-butene were charged into a stainless steel autoclave of 2 lit. internal volume satisfactorily purged with nitrogen, and the internal temperature was raised to 60° C. Subsequently, 0.9 mmol of triisobutylaluminum and 2.0 ml of the above catalyst solution (0.0005 mmol in terms of Zr) were introduced under pressure with ethylene to thereby initiate polymerization. Thereafter, ethylene only was continuously fed to thereby maintain the total pressure at 24.0 kg/cm$^2$-G. Polymerization was conducted at 150° C. for 30 min.

A small amount of ethanol was introduced into the reaction system to thereby terminate the polymerization, and unreacted ethylene was discharged. The thus obtained polymer was placed in a large excess of methanol so that the polymer was precipitated. The polymer was recovered by filtration and dried in vacuum overnight. Thus, a long-chain branched ethylene/1-butene copolymer (A-3) was obtained.

The obtained copolymer had an ethylene content of 89 mol %; a 1-butene content of 11 mol %; a density of 0.89 g/cm$^3$; a melt flow rate (measured at 190° C. under a load of 2.16 kg in accordance with ASTM D 1238) of 3.6 g/10 min; a crystallinity, as measured by X-ray diffractometry, of 18%; a molecular weight distribution (Mw/Mn), as determined by GPC, of 1.9; a g$\eta$* value of 0.89; and a melt tension, as measured by the following method, of 1.2 g.

Method of measuring melt tension:

Pellets of the ethylene/1-butene copolymer were melted at 190° C., and a strand was extruded through nozzle (L=8 mm and D=2.095 mm) and drawn, The melt tension at the time of strand drawing was measured.

Production Example 2

(Production of linear ethylene/1-butene copolymer (A-1))

A catalyst solution was prepared in the same manner as in Production Example 1 except that bis(1,3-dimethylcyclopentadienyl)zirconium dichloride was used in place of rac-dimethylsilylene-bis{1-(2-methyl-4-phenylindenyl)}zirconium dichloride.

A linear ethylene/1-butene copolymer (A-1) was produced in the same manner as in Production Example 1 except that the above catalyst solution was used, 175 ml of 1-butene was added and copolymerization reaction of ethylene and 1-butene was performed at 90° C. and at a total pressure of 8.0 kg/cm$^2$-G while feeding hydrogen at a rate of 80 ml/hr.

The obtained copolymer had an ethylene content of 91 mol %; a 1-butene content of 9 mol %; a density of 0.89 g/cm$^3$; a melt flow rate (measured at 190° C. under a load of 2.16 kg in accordance with ASTM D 1238) of 3.6 g/10 min; a crystallinity, as measured by X-ray diffractometry, of 20%; a molecular weight distribution (Mw/Mn), as determined by GPC, of 2.1; a g$\eta$* value of 1.00; and a melt tension of 0.5 g.

Example A1

A mixture consisting of:
100 parts by weight of linear ethylene/1-butene copolymer (A-1) having an ethylene content of 91 mol %, a density (ASTM D 1505) of 0.89 g/cm$^3$, an MFR (measured at 190° C. under a load of 2.16 kg in accordance with ASTM D 1238) of 3.6 g/10 min, an Mw/Mn of 2.1 and a g$\eta$* value of 1.00, obtained in Product-ion Example 2;
0.5 part by weight of dicumyl peroxide (DCP);
0.35 part by weight (in terms of TAIC contents) of triallyl isocyanurate (TAIC) (trade name: M-60 (TAIC content 60%), produced by Nippon Kasei Chemical Co., Ltd.);
7 parts by weight of azodicarbonamide; and
10 parts by weight of talc, was milled by means of rolls whose surface temperature was set at 100° C. for 10 min, and sheeted.

The obtained sheet was charged into a press metal mold and heated under a pressure of 150 kg/cm² at 160° C. for 12 min. Thus, a foam (24.5 mm thickness, 150 mm length and 200 mm width) was obtained.

The expansion ratio, compression set and tear strength of the obtained foam were measured by the above methods, and the soft touch and foaming uniformity were evaluated by the above methods. The results are given in Table 1.

Example A2

The same procedure as in Example A1 was repeated except that 50 parts by weight of the linear ethylene/1-butene copolymer (A-1) employed in Example A1 and 50 parts by weight of linear ethylene/1-hexene copolymer (A-2) having an ethylene content of 95 mol %, a density (ASTM D 1505) of 0.91 g/cm³, an MFR (measured at 190° C. under a load of 2.16 kg in accordance with ASTM D 1238) of 4.0 g/10 min, an Mw/Mn of 2.0 and a g$\eta$* value of 1.00 were used in place of the 100 parts by weight of linear ethylene/1-butene copolymer (A-1). The results are given in Table 1.

Example A3

The same procedure as in Example A1 was repeated except that the amounts of added dicumyl peroxide (DCP) and triallyl isocyanurate (TAIC) were changed to 0.8 part by weight and 0.1 part by weight (in terms of TAIC contents), respectively. The results are given in Table 1.

Example A4

The same procedure as in Example A1 was repeated except that the amounts of added dicumyl peroxide (DCP) and triallyl isocyanurate (TAIC) were changed to 0.2 part by weight and 0.6 part by weight (in terms of TAIC contents), respectively. The results are given in Table 1.

Example A5

The same procedure as in Example A1 was repeated except that 10 parts by weight of sodium hydrogencarbonate was used in place of the azodicarbonamide. The results are given in Table 1.

Example A6

The same procedure as in Example A1 was repeated except that the long-chain branched ethylene/1-butene copolymer (A-3) having an ethylene content of 89 mol %, a density (ASTM D 1505) of 0.89 g/cm³, an MFR (measured at 190° C. under a load of 2.16 kg in accordance with ASTM D 1238) of 3.6 g/10 min, an Mw/Mn of 1.9 and a g$\eta$* value of 0.89, produced in Production Example 1, was used in place of the linear ethylene/1-butene copolymer (A-1). The results are given in Table 1.

Comparative Example A1

The same procedure as in Example A1 was repeated except that the triallyl isocyanurate (TAIC) was not used. The results are given in Table 1.

Comparative Example A2

The same procedure as in Example A1 was repeated except that an ethylene/vinyl acetate copolymer having a vinyl acetate content of 19% by weight, a density (ASTM D 1505) of 0.94 g/cm³ and an MFR (measured at 190° C. under a load of 2.16 kg in accordance with ASTM D 1238) of 2.5 g/10 min was used in place of the linear ethylene/1-butene copolymer (A-1). The results are given in Table 1.

TABLE 1

| | Example | | | | | | Comp. Ex. | |
|---|---|---|---|---|---|---|---|---|
| | A1 | A2 | A3 | A4 | A5 | A6 | A1 | A2 |
| Formulation of olefin elastomer compsn. (pts. wt.) ethylene/ α-olefin copolymer | | | | | | | | |
| linear ethylene/1-butene copolymer (A-1) | 100 | 50 | 100 | 100 | 100 | — | 100 | — |
| linear ethylene/1-hexene copolymer (A-2) | — | 50 | — | — | — | — | — | — |
| long-chain branched ethylene/1-butene copolymer (A-3) | — | — | — | — | — | 100 | — | — |
| ethylene/vinyl acetate copolymer | — | — | — | — | — | — | — | 100 |
| crosslinking agent | | | | | | | | |
| DCP | 0.5 | 0.5 | 0.8 | 0.2 | 0.5 | 0.5 | 0.5 | 0.5 |
| crosslinking auxiliary | | | | | | | | |
| TAIC | 0.35 | 0.35 | 0.1 | 0.6 | 0.35 | 0.35 | 0 | 0.36 |
| foaming agent | | | | | | | | |
| azodicarbonamide | 7 | 7 | 7 | 7 | — | 7 | 7 | 7 |
| sodium hydrogencarbonate | — | — | — | — | 10 | — | — | — |
| filler | | | | | | | | |
| talc | 10 | 10 | 10 | 10 | 10 | 10 | 10 | 10 |
| Result | | | | | | | | |
| specific gravity | 0.095 | 0.080 | 0.077 | 0.085 | 0.101 | 0.079 | 0.817 | 0.136 |
| expansion ratio (times) | 10.3 | 12.2 | 12.8 | 11.5 | 9.8 | 12.5 | 1.2 | 7.2 |
| compression set (%) | 52 | 57 | 58 | 54 | 55 | 50 | — | 80 |
| tear strength (kg/cm) | 1.9 | 1.8 | 2.0 | 1.7 | 1.7 | 1.9 | — | 1.7 |
| touch | 5 | 4 | 4 | 5 | 5 | 5 | 1 | 2 |
| foaming uniformity | AA | AA | A | A | A | AA | C | A |

Examples A7 to A12

The crosslinked foams obtained in Examples A1 to A6 were shaved taking into account the configuration of a molding metal mold and the compression ratio and transferred into the molding metal mold heated at 160° C. Pressure of 150 kg/cm² was applied for 11 min at a compression ratio of 1.7 to thereby effect a shaping.

Immediately after the completion of the above heating under pressure, the molding metal mold with a foam held in its cavity was cooled. Thus, secondarily compressed crosslinked foams were obtained. The properties of the obtained foams are listed in Table 2.

Example A13

A secondarily compressed crosslinked foam was produced from the crosslinked foam obtained in Example A1 in the same manner as in Example A7, except that pressure was applied at a compression ratio of 2.0. The properties of the obtained foam are listed in Table 2.

Comparative Example A3

A secondarily compressed crosslinked foam was obtained in the same manner as in Example A7, except that the crosslinked foam obtained in Comparative Example A2 was used in place of the crosslinked foam obtained in Example A1. The properties of the obtained foam are listed in Table 2.

Example A14

A foam was obtained in the same manner as in Example A1, except that 100 parts by weight of linear ethylene/1-butene copolymer (A-4) having an ethylene content of 89 mol %, a density (ASTM D 1505) of 0.89 g/cm³, an MFR (measured at 190° C. under a load of 2.16 kg in accordance with ASTM D 1238) of 1.8 g/10 min, an Mw/Mn of 2.5 and a g$\eta$* value of 1.00 was used in place of the 100 parts by weight of linear ethylene/1-butene copolymer (A-1), and talc was not used.

Thereafter, a secondarily compressed crosslinked foam was produced from this foam in the same manner as in Example A7. The properties of the obtained foam are listed in Table 3.

Example A15

A foam was obtained in the same manner as in Example A14, except that 70 parts by weight of linear ethylene/1-butene copolymer (A-4) and 30 parts by weight of linear ethylene/1-hexene copolymer (A-5) having an ethylene content of 94 mol %, a density (ASTM D 1505) of 0.91 g/cm³, an MFR (measured at 190° C. under a load of 2.16 kg in accordance with ASTM D 1238) of 1.5 g/10 min, an Mw/Mn of 2.1 and a g$\eta$* value of 1.00 were used in place of the 100 parts by weight of linear ethylene/1-butene copolymer (A-4), and talc was not used.

Thereafter, a secondarily compressed crosslinked foam was produced from this foam in the same manner as in Example A7. The properties of the obtained foam are listed in Table 3.

TABLE 2

| | Example | | | | | | | Comp. Ex. |
|---|---|---|---|---|---|---|---|---|
| | A7 | A8 | A9 | A10 | A11 | A12 | A13 | A3 |
| Foam before re-compression | Foam of Example A1 | Foam of Example A2 | Foam of Example A3 | Foam of Example A4 | Foam of Example A5 | Foam of Example A6 | Foam of Example A1 | Foam of Comp. Ex. A2 |
| Compression ratio | 1.7 | 1.7 | 1.7 | 1.7 | 1.7 | 1.7 | 2.0 | 1.7 |
| Properties of foam after re-compression | | | | | | | | |
| specific gravity | 0.15 | 0.13 | 0.13 | 0.14 | 0.16 | 0.13 | 0.19 | 0.23 |
| compression set (%) | 38 | 42 | 44 | 42 | 43 | 36 | 27 | 63 |
| tear strength (kg/cm) | 2.5 | 2.7 | 2.6 | 2.2 | 2.3 | 2.5 | 3.1 | 3.1 |

TABLE 3

| | Example | |
|---|---|---|
| | A14 | A15 |
| Formulation of olefin elastomer compsn. (pts. wt.) ethylene/α-olefin copolymer | | |
| linear ethylene/1-butene copolymer (A-4) | 100 | 70 |
| linear ethylene/1-hexene copolymer (A-5) | — | 30 |
| crosslinking agent | | |
| DCP | 0.5 | 0.5 |
| crosslinking auxiliary | | |
| TAIC | 0.35 | 0.35 |
| foaming agent | | |
| azodicarbonamide | 7 | 7 |
| Compression ratio | 1.7 | 1.7 |
| Properties of foam after re-compression | | |
| specific gravity | 0.14 | 0.13 |
| compression set (%) | 36 | 37 |
| tear strength (kg/cm) | 2.6 | 2.9 |

Example B1

A mixture consisting of:
95 parts by weight of linear ethylene/1-butene copolymer (A-1) having an ethylene content of 91 mol %, a density (ASTM D 1505) of 0.89 g/cm³, an MFR (measured at 190° C. under a load of 2.16 kg in accordance with ASTM D 1238) of 3.6 g/10 min, an Mw/Mn of 2.1 and a gη* value of 1.00;

5 parts by weight of modified ethylene/1-butene copolymer (graft amount (in terms of maleic anhydride)=0.5% by weight) obtained by grafting with maleic anhydride an ethylene/1-butene copolymer having an ethylene content of 89 mol %, a density (ASTM D 1505) of 0.89 g/cm$^3$ and an MFR (measured at 190° C. under a load of 2.16 kg in accordance with ASTM D 1238) of 3.6 g/10 min;

0.5 part by weight of dicumyl peroxide (DCP);

0.35 part by weight (in terms of TAIC contents) of triallyl isocyanurate (TAIC) (trade name: M-60 (TAIC content 60%), produced by Nippon Kasei Chemical Co., Ltd.);

7 parts by weight of azodicarbonamide, and 10 parts by weight of talc, was milled by means of rolls whose surface temperature was set at 120° C. for 10 min, and sheeted.

The obtained sheet was charged into a press metal mold and heated under a pressure of 150 kg/cm$^2$ at 160° C. for 12 min. Thus, a foam (24.5 mm thickness, 150 mm length and 200 mm width) was obtained.

The expansion ratio, compression set and tear strength of the obtained foam were measured by the above methods, and the soft touch and foaming uniformity were evaluated by the above methods. The results are given in Table 4.

The thus obtained crosslinked foam was shaved taking into account the configuration of a molding metal mold and the compression ratio and transferred into the molding metal mold heated at 160° C. Pressure of 150 kg/cm$^2$ was applied for 10 min at a compression ratio of 1.7 to thereby effect a shaping.

Immediately after the completion of the above heating under pressure, the molding metal mold with a foam held in its cavity was cooled. Thus, a secondarily compressed crosslinked foam was obtained. The properties of the obtained foam are listed in Table 5.

Example B2

The same procedure as in Example B1 was repeated except that a linear ethylene/1-butene copolymer (A-4) having an ethylene content of 89 mol %, a density (ASTM D 1505) of 0.89 g/cm$^3$, an MFR (measured at 190° C. under a load of 2.16 kg in accordance with ASTM D 1238) of 1.8 g/10 min, an Mw/Mn of 2.5 and a gη* value of 1.00 was used in place of the linear ethylene/1-butene copolymer (A-1). The results are given in Table 4.

A secondarily compressed crosslinked foam was produced from the thus obtained crosslinked foam in the same manner as in Example B1. The properties of the obtained foam are listed in Table 5.

Example B3

The same procedure as in Example B1 was repeated except that 50 parts by weight of a linear ethylene/1-butene copolymer (A-1) and 45 parts by weight of a linear ethylene/1-hexene copolymer (A-5) having an ethylene content of 94 mol %, a density (ASTM D 1505) of 0.91 g/cm$^3$, an MFR (measured at 190° C. under a load of 2.16 kg in accordance with ASTM D 1238) of 1.5 g/10 min, an Mw/Mn of 2.1 and a gη* value of 1.00 was used in place of 95 parts by weight of the linear ethylene/1-butene copolymer (A-1). The results are given in Table 4.

A secondarily compressed crosslinked foam was produced from the thus obtained crosslinked foam in the same manner as in Example B1. The properties of the obtained foam are listed in Table 5.

Example B4

The same procedure as in Example B1 was repeated except that 80 parts by weight of the linear ethylene/1-butene copolymer (A-4) as used in Example B2 and 20 parts by weight of the high-pressure processed low-density polyethylene having a density (ASTM D 1505) of 0.92 g/cm$^3$ and an MFR (measured at 190° C. under a load of 2.16 kg in accordance with ASTM D 1238) of 3.0 g/10 min were used in place of 95 parts by weight of the linear ethylene/1-butene copolymer (A-1) and 5 parts by weight of the modified ethylene/1-butene copolymer. The results are given in Table 4.

A secondarily compressed crosslinked foam was produced from the thus obtained crosslinked foam in the same manner as in Example B1. The properties of the obtained foam are listed in Table 5.

Example B5

The same procedure as in Example B4 was repeated except that 40 parts by weight of the linear ethylene/1-butene copolymer (A-1) as used in Example B1 and 40 parts by weight of the linear ethylene/1-hexene copolymer (A-5) as used in Example B3 were used in place of 80 parts by weight of the linear ethylene/1-butene copolymer (A-4). The results are given in Table 4.

A secondarily compressed crosslinked foam was produced from the thus obtained crosslinked foam in the same manner as in Example B1. The properties of the obtained foam are listed in Table 5.

Example B6

The same procedure as in Example B4 was repeated except that 75 parts by weight of the linear ethylene/1-butene copolymer (A-4) and 5 parts by weight of the modified ethylene/1-butene copolymer were used in place of 80 parts by weight of the linear ethylene/1-butene copolymer (A-4). The results are given in Table 4.

A secondarily compressed crosslinked foam was produced from the thus obtained crosslinked foam in the same manner as in Example B1. The properties of the obtained foam are listed in Table 5.

Example B7

The same procedure as in Example B5 was repeated except that 35 parts by weight of the linear ethylene/1-hexene copolymer (A-5) and 5 parts by weight of the modified ethylene/1-butene copolymer were used in place of 40 parts by weight of the linear ethylene/1-hexene copolymer (A-5). The results are given in Table 4.

A secondarily compressed crosslinked foam was produced from the thus obtained crosslinked foam in the same manner as in Example B1. The properties of the obtained foam are listed in Table 5.

Example B8

The same procedure as in Example B1 was repeated except that the amounts of added dicumyl peroxide (DCP) and triallyl isocyanurate (TAIC) were changed to 0.8 part by weight and 0.1 part by weight (in terms of TAIC contents), respectively. The results are given in Table 4.

A secondarily compressed crosslinked foam was produced from the thus obtained crosslinked foam in the same manner as in Example B1. The properties of the obtained foam are listed in Table 5.

Example B9

The same procedure as in Example B1 was repeated except that long-chain branched ethylene/1-butene copolymer (A-3) having an ethylene content of 89 mol %, a density (ASTM D 1505) of 0.89 g/cm$^3$, an MFR (measured at 190° C. under a load of 2.16 kg in accordance with ASTM D 1238) of 3.6 g/10 min, an Mw/Mn of 1.9 and a gη* value of 0.89 was used in place of the linear ethylene/1-butene copolymer (A-1). The results are given in Table 4.

A secondarily compressed crosslinked foam was produced from the thus obtained crosslinked foam in the same manner as in Example B1. The properties of the obtained foam are listed in Table 5.

Comparative Example B1

The same procedure as in Example B1 was repeated except that 100 parts by weight of an ethylene/vinyl acetate copolymer (vinyl acetate content: 19% by weight) having a density (ASTM D 1505) of 0.94 g/cm$^3$ and an MFR (measured at 190° C. under a load of 2.16 kg in accordance with ASTM D 1238) of 2.5 g/10 min was used in place of 95 parts by weight of the linear ethylene/1-butene copolymer (A-1) and 5 parts by weight of the modified etylene/1-butene copolymer. The results are given in Table 4.

A secondarily compressed crosslinked foam was produced from the thus obtained crosslinked foam in the same manner as in Example B1. The properties of the obtained foam are listed in Table 5.

TABLE 4

| | Ex. B1 | Ex. B2 | Ex. B3 | Ex. B4 | Ex. B5 | Ex. B6 | Ex. B7 | Ex. B8 | Ex. B9 | Comp. Ex. B1 |
|---|---|---|---|---|---|---|---|---|---|---|
| Formulation of olefin elastomer compsn. (pts. wt.) ethylene/α-olefin copolymer | | | | | | | | | | |
| linear ethylene/1-butene copolymer (A-1) | 95 | | 50 | | 40 | | 40 | 95 | | |
| long-chain branched ethylene/1-butene copolymer (A-3) | | | | | | | | | 95 | |
| linear ethylene/1-butene copolymer (A-4) | | 95 | | 80 | | 75 | | | | |
| linear ethylene/1-hexene copolymer (A-5) | | | 45 | | 40 | | 35 | | | |
| modified polyolefin | | | | | | | | | | |
| modified ethylene/1-butene copolymer | 5 | 5 | 5 | | | 5 | 5 | 5 | 5 | |
| high-pressure processed low-density polyethylene | | | | | | | | | | |
| ethylene homopolymer | | | | 20 | 20 | 20 | 20 | | | |
| ethylene/vinyl acetate copolymer | | | | | | | | | | 100 |
| crosslinking agent | | | | | | | | | | |
| DCP | 0.5 | 0.5 | 0.5 | 0.5 | 0.5 | 0.5 | 0.5 | 0.8 | 0.5 | 0.5 |
| crosslinking auxiliary | | | | | | | | | | |
| TAIC | 0.35 | 0.35 | 0.35 | 0.35 | 0.35 | 0.35 | 0.35 | 0.1 | 0.35 | 0.35 |
| foaming agent | | | | | | | | | | |
| azodicarbonamide | 7 | 7 | 7 | 7 | 7 | 7 | 7 | 7 | 7 | 7 |
| filler | | | | | | | | | | |
| Talc | 10 | 10 | 10 | 10 | 10 | 10 | 10 | 10 | 10 | 10 |
| Result | | | | | | | | | | |
| specific gravity | 0.098 | 0.086 | 0.090 | 0.086 | 0.089 | 0.088 | 0.091 | 0.082 | 0.084 | 0.136 |
| expansion ratio (times) | 10.1 | 11.4 | 10.9 | 11.4 | 11.0 | 11.1 | 10.8 | 12.0 | 11.7 | 7.2 |
| compression set (%) | 55 | 53 | 54 | 52 | 54 | 54 | 56 | 59 | 54 | 80 |
| tear strength (kg/cm) | 2.0 | 2.0 | 2.1 | 2.0 | 2.1 | 2.1 | 2.2 | 2.1 | 2.0 | 1.7 |
| touch | 5 | 5 | 4 | 5 | 4 | 5 | 4 | 4 | 5 | 2 |
| foaming uniformity | AA | AA | AA | AA | AA | AA | AA | A | AA | A |

TABLE 5

| | Ex. B1 | Ex. B2 | Ex. B3 | Ex. B4 | Ex. B5 | Ex. B6 | Ex. B7 | Ex. B8 | Ex. B9 | Comp. Ex. B1 |
|---|---|---|---|---|---|---|---|---|---|---|
| Compression ratio | 1.7 | 1.7 | 1.7 | 1.7 | 1.7 | 1.7 | 1.7 | 1.7 | 1.7 | 1.7 |
| Properties of foam after re-compression | | | | | | | | | | |
| specific gravity | 0.15 | 0.13 | 0.14 | 0.14 | 0.14 | 0.13 | 0.14 | 0.13 | 0.13 | 0.23 |
| compression set (%) | 40 | 37 | 39 | 35 | 41 | 35 | 43 | 43 | 38 | 63 |
| tear strength (kg/cm) | 2.7 | 2.8 | 2.9 | 2.9 | 3.0 | 3.0 | 3.2 | 2.8 | 2.8 | 3.1 |

Example C1

A mixture consisting of:

90 parts by weight of linear ethylene/1-butene copolymer (A-1) having an ethylene content of 91 mol %, a density (ASTM D 1505) of 0.89 g/cm³, an MFR (measured at 190° C. under a load of 2.16 kg in accordance with ASTM D 1238) of 3.6 g/10 min and a gη* value of 1.00;

10 parts by weight of propylene/ethylene block copolymer (ethylene content=15 mol %) having a density (ASTM D 1505) of 0.91 g/cm³ and an MFR (measured at 230° C. under a load of 2.16 kg in accordance with ASTM D 1238) of 23 g/10 min;

0.5 part by weight of dicumyl peroxide (DCP);

0.35 part by weight (in terms of TAIC contents) of triallyl isocyanurate (TAIC) (trade name: M-60 (TAIC content 60%), produced by Nippon Kasei Chemical Co., Ltd.);

7 parts by weight of azodicarbonamide; and 10 parts by weight of talc, was milled by means of rolls whose surface temperature was set at 110° C. for 10 min, and sheeted.

The obtained sheet was charged into a press metal mold and heated under a pressure of 150 kg/cm² at 160° C. for 12 min. Thus, a foam (26 mm thickness, 163 mm length and 210 mm width) was obtained.

The expansion ratio, compression set and tear strength of the obtained foam were measured by the above methods, and the soft touch and foaming uniformity were evaluated by the above methods. The results are given in Table 6.

Example C2

The same procedure as in Example C1 was repeated except that 10 parts by weight of propylene homopolymer having a density (ASTM D 1505) of 0.91 g/cm³ and an MFR (measured at 230° C. under a load of 2.16 kg in accordance with ASTM D 1238) of 20 g/10 min was used in place of the 10 parts by weight of propylene/ethylene block copolymer. The results are given in Table 6.

Example C3

The same procedure as in Example C1 was repeated except that 10 parts by weight of propylene/ethylene random copolymer (propylene content: 96 mol %) having a density (ASTM D 1505) of 0.90 g/cm³ and an MFR (measured at 230° C. under a load of 2.16 kg in accordance with ASTM D 1238) of 7 g/10 min was used in place of the 10 parts by weight of propylene/ethylene block copolymer. The results are given in Table 6.

Example C4

The same procedure as in Example C1 was repeated except that 10 parts by weight of propylene/1-butene random copolymer (propylene content: 75 mol %) having a density (ASTM D 1505) of 0.89 g/cm³ and an MFR (measured at 230° C. under a load of 2.16 kg in accordance with ASTM D 1238) of 6 g/10 min was used in place of the 10 parts by weight of propylene/ethylene block copolymer. The results are given in Table 6.

Example C5

The same procedure as in Example C1 was repeated except that 45 parts by weight of linear ethylene/1-butene copolymer (A-1) and 45 parts by weight of ethylene/1-hexene copolymer (A-2) having an ethylene content of 95 mol %, a density (ASTM D 1505) of 0.91 g/cm³ and an MFR (measured at 190° C. under a load of 2.16 kg in accordance with ASTM D 1238) of 4.0 g/10 min was used in place of the 90 parts by weight of linear ethylene/1-butene copolymer (A-1). The results are given in Table 6.

Example C6

The same procedure as in Example C1 was repeated except that the amounts of added dicumyl peroxide (DCP) and triallyl isocyanurate (TAIC) were changed to 0.8 part by weight and 0.1 part by weight (in terms of TAIC contents), respectively. The results are given in Table 6.

Example C7

The same procedure as in Example C1 was repeated except that the amounts of added dicumyl peroxide (DCP) and triallyl isocyanurate (TAIC) were changed to 0.2 part by weight and 0.6 part by weight (in terms of TAIC contents), respectively. The results are given in Table 6.

Example C8

The same procedure as in Example C1 was repeated except that 10 parts by weight of sodium hydrogencarbonate was used in place of the azodicarbonamide. The results are given in Table 6.

Example C9

The same procedure as in Example C1 was repeated except that long-chain branched ethylene/1-butene copolymer (A-3) having an ethylene content of 89 mol %, a density (ASTM D 1505) of 0.89 g/cm³, an MFR (measured at 190° C. under a load of 2.16 kg in accordance with ASTM D 1238) of 3.6 g/10 min and a gη* value of 0.89 was used in place of the linear ethylene/1-butene copolymer (A-1). The results are given in Table 6.

Comparative Example C1

The same procedure as in Example C1 was repeated except that the triallyl isocyanurate (TAIC) was not used. The results are given in Table 6.

Comparative Example C2

The same procedure as in Example C1 was repeated except that an ethylene/vinyl acetate copolymer (vinyl acetate content: 19% by weight) having a density (ASTM D 1505) of 0.94 g/cm³ and an MFR (measured at 190° C. under a load of 2.16 kg in accordance with ASTM D 1238) of 2.5 g/10 min was used in place of the linear ethylene/1-butene copolymer (A-1). The results are given in Table 6.

TABLE 6

| | Example | | | | | | | |
|---|---|---|---|---|---|---|---|---|
| | C1 | C2 | C3 | C4 | C5 | C6 | C7 | C8 |
| Formulation of olefin elastomer compsn. (pts. wt.) | | | | | | | | |
| ethylene/α-olefin copolymer | | | | | | | | |
| linear ethylene/1-butene copolymer (A-1) | 90 | 90 | 90 | 90 | 45 | 90 | 90 | 90 |
| linear ethylene/1-hexene copolymer (A-2) | — | — | — | — | 45 | — | — | — |
| polypropylene | | | | | | | | |
| propylene/ethylene block copolymer | 10 | — | — | — | 10 | 10 | 10 | 10 |
| propylene homopolymer | — | 10 | — | — | — | — | — | — |
| propylene/ethylene random copolymer | — | — | 10 | — | — | — | — | — |
| propylene/1-butene random copolymer | — | — | — | 10 | — | — | — | — |
| crosslinking agent | | | | | | | | |
| DCP | 0.5 | 0.5 | 0.5 | 0.5 | 0.5 | 0.8 | 0.2 | 0.5 |
| crosslinking auxiliary | | | | | | | | |
| TAIC | 0.35 | 0.35 | 0.35 | 0.35 | 0.35 | 0.1 | 0.6 | 0.35 |
| foaming agent | | | | | | | | |
| azodicarbonamide | 7 | 7 | 7 | 7 | 7 | 7 | 7 | — |
| sodium hydrogencarbonate | — | — | — | — | — | — | — | 10 |
| filler | | | | | | | | |
| talc | 10 | 10 | 10 | 10 | 10 | 10 | 10 | 10 |
| Result | | | | | | | | |
| expansion ratio (times) | 12.5 | 13.0 | 12.7 | 12.8 | 11.6 | 9.8 | 13.5 | 10.5 |
| compression set (%) | 57 | 58 | 56 | 56 | 57 | 59 | 56 | 56 |
| tear strength (kg/cm) | 1.7 | 1.7 | 1.8 | 1.8 | 1.7 | 2.0 | 1.7 | 1.7 |
| touch | 5 | 4 | 5 | 5 | 4 | 4 | 5 | 5 |
| foaming uniformity | AA | A | AA | AA | A | A | A | A |

| | Ex. | Comp. Ex. | |
|---|---|---|---|
| | C9 | C1 | C2 |
| Formulation of olefin elastomer compsn. (pts. wt.) | | | |
| ethylene/α-olefin copolymer | | | |
| linear ethylene/1-butene copolymer (A-1) | — | 90 | — |
| long-chain branched ethylene/1-butene copolymer (A-3) | 90 | — | — |
| ethylene/vinyl acetate copolymer | — | — | 100 |
| polypropylene | | | |
| propylene/ethylene block copolymer | 10 | 10 | — |
| crosslinking agent | | | |
| DCP | 0.5 | 0.5 | 0.5 |
| crosslinking auxiliary | | | |
| TAIC | 0.35 | 0 | 0.35 |
| foaming agent | | | |
| azodicarbonamide | 7 | 7 | 7 |
| sodium hydrogencarbonate | — | — | — |
| filler | | | |
| talc | 10 | 10 | 10 |
| Result | | | |
| expansion ratio (times) | 13.1 | 1.3 | 7.2 |
| compression set (%) | 55 | — | 80 |
| tear strength (kg/cm) | 1.9 | — | 1.7 |
| touch | 5 | 1 | 2 |
| foaming uniformity | AA | C | A |

What is claimed is:

1. A crosslinked olefin elastomer foam having a specific gravity of 0.05 to 0.2, an expansion ratio of 10.5 to 15, a compression set of 30 to 60% and a tear strength of 1.5 to 2.5 kg/cm.

2. The crosslinked olefin elastomer foam as claimed in claim 1, wherein the expansion ratio of the foam is from 11.5 to 15.

3. A crosslinked olefin elastomer foam having a specific gravity of 0.05 to 0.2, an expansion ratio of 9.8 to 15, a compression set of 30 to 60% and a tear strength of 1.5 to 2.5 kg/cm, comprising an ethylene/α-olefin compolymer.

4. A crosslinked olefin elastomer foam having a specific gravity of 0.05 to 0.2, an expansion ratio of 8 to 15, a compression set of 30 to 60% and a tear strength of 1.5 to 2.5 kg/cm, comprising an olefin elastomer, which comprises 50 to 100 parts by weight, based on 100 parts by weight of the olefin elastomer, of an ethylene/α-olefin copolymer.

5. A crosslinked olefin elastomer foam having a specific gravity of 0.05 to 0.2, an expansion ratio of 8 to 15, a compression set of 30 to 60% and a tear strength of 1.5 to 2.5 kg/cm prepared from an olefin elastomer, which comprises 50 to 95 parts by weight, based on 100 parts by weight of the olefin elastomer, of an ethylene/α-olefin copolymer.

6. A crosslinked olefin elastomer foam having a specific gravity of 0.05 to 0.2, an expansion ratio of 8 to 15, a compression set of 30 to 60% and a tear strength of 1.5 to 2.5 kg/cm prepared from an olefin elastomer, which comprises 70 to 98 parts by weight, based on 100 parts by weight of the olefin elastomer, of an ethylene/α-olefin copolymer.

7. A crosslinked olefin elastomer foam having a specific gravity of 0.01 to 0.2, a compression set of 20 to 60% and a tear strength of 2.0 to 4.0 kg/cm, comprising an olefin elastomer, which comprises 50 to 100 parts by weight, based on 100 parts by weight of the olefin elastomer, of an ethylene/α-olefin copolymer.

8. A crosslinked olefin elastomer foam having a specific gravity of 0.01 to 0.2, a compression set of 20 to 60% and a tear strength of 2.0 to 4.0 kg/cm, comprising an olefin elastomer, which comprises 50 to 95 parts by weight, based on 100 parts by weight of the olefin elastomer, of an ethylene/α-olefin copolymer.

9. The crosslinked olefin elastomer foam as claimed in claim 3 or 7, which is a crosslinked foam obtained by heating an olefin elastomer composition, the olefin elastomer composition comprising an ethylene/α-olefin copolymer (A) having a density of 0.88 to 0.92 g/cm$^3$ and a melt flow rate (measured at 190° C. under a load of 2.16 kg in accordance with ASTM D 1238) of 0.1 to 10 g/10 mm;

an organic peroxide (D);

a crosslinking auxiliary (E); and a foaming agent (F).

10. The crosslinked olefin elastomer foam as claimed in claim 9, wherein the ethylene/α-olefin copolymer (A) has a molecular weight distribution (Mw/Mn), as measured by gel permeation chromatography (GPC), of 2.3 to 4.0.

11. The crosslinked olefin elastomer foam as claimed in claim 9, wherein the crosslinking auxiliary (E) and the organic peroxide (D) are used in a weight ratio ((E)/(D)) of 1/8 to 3/1.

12. The crosslinked olefin elastomer foam as claimed in claim 4, wherein the expansion ratio is 10.5 to 15.

* * * * *

UNITED STATES PATENT AND TRADEMARK OFFICE
CERTIFICATE OF CORRECTION

PATENT NO.     : 6,617,366 B2
DATED          : September 9, 2003
INVENTOR(S)    : Takanori Sueda et al.

It is certified that error appears in the above-identified patent and that said Letters Patent is hereby corrected as shown below:

<u>Title page,</u>
Item [*], Notice, the term of patent adjustment under 35 U.S.C. §154(b) should be changed from "0 days" to -- 98 days --.

Signed and Sealed this

Thirteenth Day of July, 2004

JON W. DUDAS
*Acting Director of the United States Patent and Trademark Office*